United States Patent
Kalhan

(10) Patent No.: US 11,336,495 B2
(45) Date of Patent: *May 17, 2022

(54) DEVICE BEACON FOR COMMUNICATION MANAGEMENT FOR PEER TO PEER COMMUNICATIONS

(71) Applicant: Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/365,106

(22) Filed: Mar. 26, 2019

(65) Prior Publication Data
US 2019/0222454 A1    Jul. 18, 2019

Related U.S. Application Data

(63) Continuation of application No. 12/267,365, filed on Nov. 7, 2008, now abandoned.

(51) Int. Cl.
| | |
|---|---|
| *H04W 76/14* | (2018.01) |
| *H04L 27/26* | (2006.01) |
| *H04W 48/08* | (2009.01) |
| *H04W 56/00* | (2009.01) |
| *H04W 72/04* | (2009.01) |
| *H04W 8/00* | (2009.01) |

(52) U.S. Cl.
CPC ......... *H04L 27/2627* (2013.01); *H04W 48/08* (2013.01); *H04W 56/001* (2013.01); *H04W 72/0446* (2013.01); *H04W 72/0453* (2013.01); *H04W 76/14* (2018.02); *H04W 8/005* (2013.01)

(58) Field of Classification Search
None
See application file for complete search history.

(56) References Cited

U.S. PATENT DOCUMENTS

| | | | |
|---|---|---|---|
| 7,961,708 B2* | 6/2011 | Li | H04L 5/0053 370/304 |
| 2008/0214196 A1 | 9/2008 | Sambhwani et al. | |
| 2009/0017829 A1* | 1/2009 | Laroia | H04W 16/12 455/446 |
| 2009/0017838 A1* | 1/2009 | Laroia | H04W 48/18 455/456.1 |
| 2009/0040996 A1* | 2/2009 | Laroia | H04W 72/06 370/343 |
| 2009/0085806 A1* | 4/2009 | Piersol | G01C 21/206 342/386 |
| 2009/0210932 A1* | 8/2009 | Balakrishnan | H04W 4/029 726/5 |
| 2010/0110929 A1* | 5/2010 | Li | H04L 5/0032 370/254 |

* cited by examiner

*Primary Examiner* — Nicholas Sloms

(57) ABSTRACT

A wireless communication device transmits a device beacon in accordance with a system timing of a wireless wide area network (WWAN). For one example, the beacon is transmitted relative to WWAN uplink channels of the time-frequency space of the uplink WWAN channel assignment. In response to the reception of the device beacon by another wireless communication device, a peer to peer communication session is established.

12 Claims, 17 Drawing Sheets

DEVICE BEACON FOR COMMUNICATION MANAGEMENT FOR PEER TO PEER COMMUNICATIONS

RELATED APPLICATIONS

This application is a continuation application of U.S. patent application entitled "DEVICE BEACON FOR COMMUNICATION MANAGEMENT FOR PEER TO PEER COMMUNICATIONS", Ser. No. 12/267,365, and filed on Nov. 7, 2008 which is related to U.S. patent application entitled "DEVICE BEACON FOR HANDOFF MANAGEMENT OF HANDOFFS TO ACCESS NODES", Ser. No. 12/267,261, and to U.S. patent application entitled "DEVICE BEACON FOR HANDOFF MANAGEMENT OF HANDOFFS TO BASE STATIONS", Ser. No. 12/267,171, both filed on Nov. 7, 2008 and incorporated by reference in their entirety, herein.

BACKGROUND

The invention relates in general to wireless communication systems and more specifically to device beacon signals in a wireless communication system.

Wireless communication systems may include base stations or access nodes establish communication links to portable wireless communication devices. In peer to peer communications, the portable wireless communication devices communicate directly to each other without accessing a base station or access node. Conventional systems, however, are limited in that presence of one wireless communication device is unknown to another device even though communications between the two devices is advantageous or otherwise desired.

SUMMARY

A wireless communication device transmits a device beacon in accordance with a system timing of a wireless wide area network (WWAN). For one example, the beacon is transmitted relative to WWAN uplink channels of the time-frequency space of the uplink WWAN channel assignment. In response to the reception of the device beacon by another wireless communication device, a peer to peer communication session is established.

DETAILED DESCRIPTION

Figure 1A:
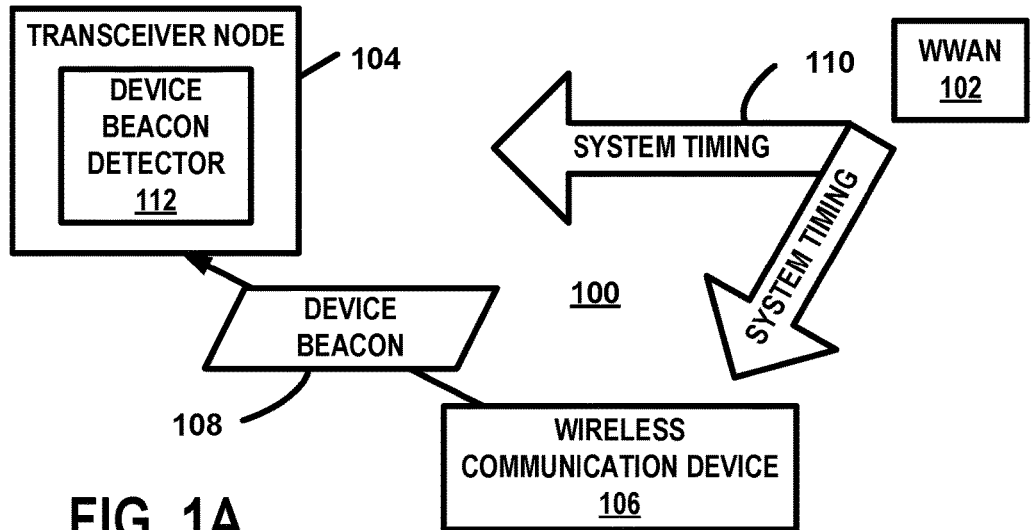
FIG. 1A is a block diagram of a communication system in accordance with an exemplary embodiment of the invention.

FIG. 1A is a block diagram of a communication system 100 that includes a wide area wireless network (WWAN) 102, a transceiver node 104, and a wireless communication device 106. The WWAN provides wireless communication services to one or more wireless communication devices 106. The wireless communication device 106, at least periodically, transmits a device beacon 108 in accordance with a system timing 110 of the WWAN 102. The transceiver node 104 also obtains the system timing 110, either wirelessly or through a wired backhaul. A device beacon detector 112 within the transceiver node 104 uses the system timing 110 to monitor device beacon channels and to receive the device beacon 108. As discussed below, the transceiver node 104 may perform any of several tasks in response to detecting the device beacon 108 where at least some of the tasks may result in establishing communications between the transceiver node 104 and the wireless communication device 106.

The device beacon 108 may be transmitted within a WWAN channel or may be transmitted in a separate frequency band outside of the WWAN frequency band. Where the device beacon 108 is transmitted within a WWAN channel, the device beacon 108 is transmitted within a time slot and frequency that minimizes interference with other communications within the WWAN 102. As discussed below, a suitable technique for such an arrangement includes performing a subcarrier mapping of the device beacon 108 with the time-frequency space of the uplink WWAN channel assignment for the wireless communication device. Some examples of channels that can be used that are outside the WWAN uplink channels include WLAN channels, WWAN adjacent bands, and channels within unlicensed bands such WiFi and Bluetooth. Also, the wireless communication device may transmit beacons during WWAN idle states and WWAN non-idle states. The device beacon detector 112 is any device that can detect the device beacon 108 when the wireless communication device 106 is sufficiently close to the transceiver node 104 where the particular implementation depends on the type of device beacon 108. For the examples discussed below, the device beacon detector 112 comprises a receiver configured to receive signals transmitted within the frequency band and with the modulation scheme used to transmit the device beacon 108.

The transceiver node 104 may be any portable, mobile, or fixed communication device that is capable of communicating with the wireless communication device 106 under the appropriate conditions. For one example discussed below with reference to FIG. 10, the transceiver node 104 is another wireless communication device that communicates on the WWAN. For the other examples discussed with reference to FIG. 1B, the transceiver node 104 is an access node providing wireless communication service where the access node may be a base station operating within the WWAN such as a femtocell base station or may be an access point of a wireless local area network (WLAN).

Figure 1B:
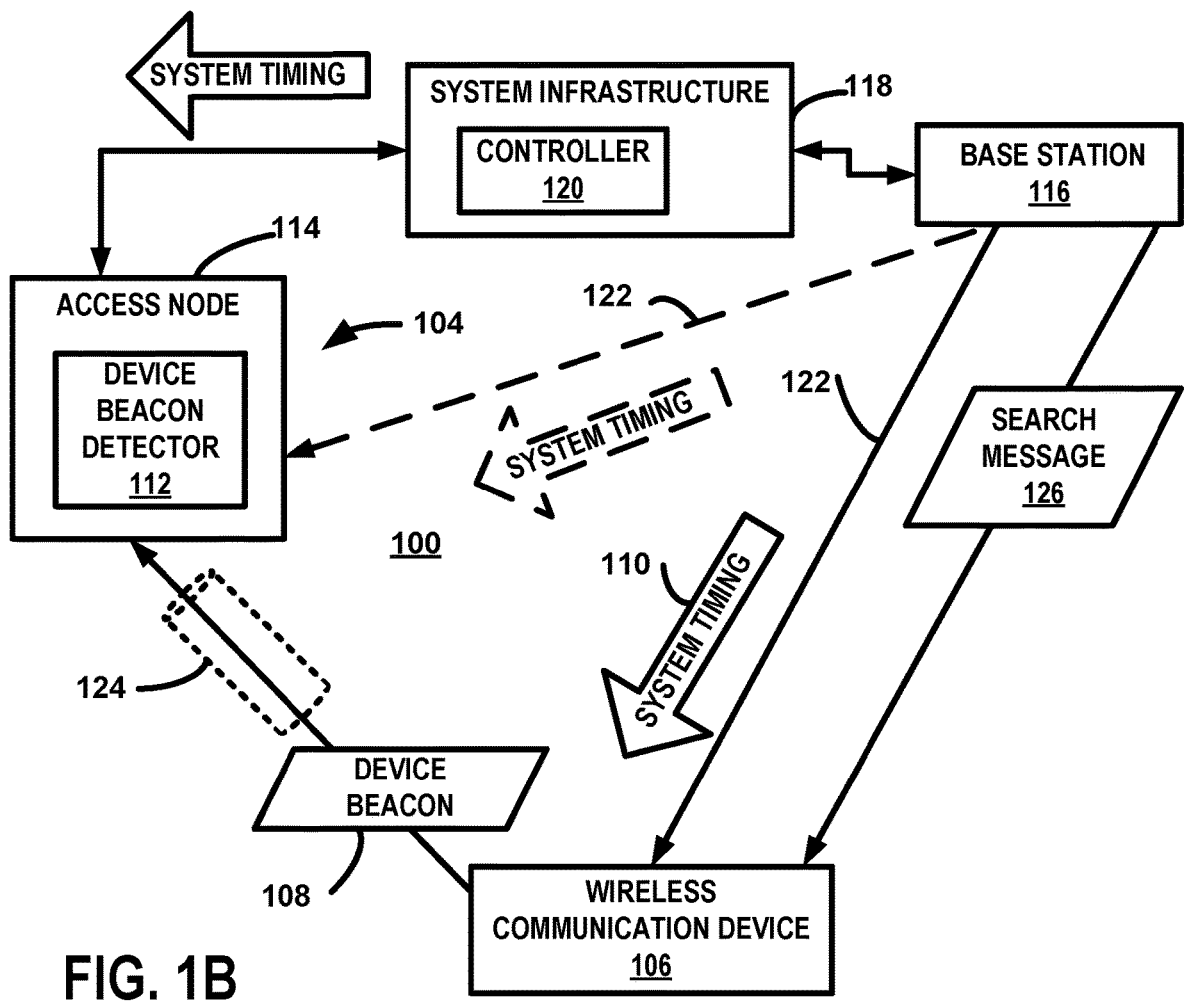
FIG. 1B is block diagram of a communication system where the transceiver node is an access node.

FIG. 1B is a block diagram of the communication system 100 where the transceiver node 104 is an access node 114. The communication system 100 includes at least one access node 114 and at least one WWAN base station 116 where the access node 114 provides wireless communication service within a geographical service area that is smaller than the geographical service area in which the base station 116 provides wireless service. The communication system 100 may be implemented in accordance with any of numerous technologies and communication standards where the access node 114 may use the same or different standard than used by the base station 116. Further, the access node 114 may be part of a separate network or may be part of the same network as the base station 116. The access node 114 may be self-managed or may be managed by the system infrastructure 118 which may also manage the base station 116. In some examples, the access node 114 is a femtocell base station operating in the same network where the base station 116 operates as a macrocell base station. In another example, the access node 114 is a wireless access point providing wireless service in a wireless local area network (WLAN) and the base station 116 provides service in a wireless wide area network (WWAN) using a different technology and standard than used by the WLAN access point. The access node 114, therefore, can be any base station, transceiver, or other communication device that provides wireless communication service to a wireless communication device to connect the wireless communication device to other devices and/or a communication network.

The system infrastructure 118 is connected to one or more base stations 116 and access nodes 114. Communications between the base station 116 and wireless communication devices 106 are at least partially managed by the system infrastructure 118 for the example. A controller 120 within the system infrastructure 118 at least includes hardware, software and/or firmware for receiving and sending control messages. The controller 120 may include at least portions of a BSC and a MSC. For the example discussed herein, the controller 120 is the equipment within the communication system 100 that performs wireless device paging functions and generates paging channel messages.

The wireless communication device 106 transmits a device beacon 108 that is based on timing information 122 received from the base station 116. Timing information is derived at the wireless communication device by receiving WWAN downlink signals 122 transmitted by the base station 116. Examples of suitable methods for acquiring WWAN system timing include receiving a sync channel or a sync-type channel. A downlink control signal may be received, for example, and accurate timing derived from the signal. In some circumstances, an early-late gate method is used to derive timing which uses an auto-correlation function. For systems that transmit information in a packetized mode, the synchronization processes may be aided by a sync preamble consisting of a training sequence. These training sequences typically have appropriate cyclic guard intervals. The preambles are periodically transmitted in between data symbols. After acquiring a coarse timing, the wireless communication may implement tracking mode where it tracks/adjusts and maintains the timing information. When the wireless communication device 106 is sufficiently close to the access node 114, the access node 114 can receive the device beacon 108 transmitted by the wireless communication device 106. The access node 114, therefore, at least periodically attempts to receive signals in the designated device beacon channels 124. As discussed, the device beacon 108 may be transmitted within designated WWAN uplink channels or outside of the WWAN band. At the appropriate times (or continuously), the device beacon detector 112 tunes to the appropriate frequencies and/or uses the appropriate scrambling codes to monitor the device beacon channels 124 where device beacons 108 may be present. The device beacon detector 112, therefore, is any device that is able to monitor the device beacon channels 124 and determine when a device beacon 108 is present. For the examples discussed herein, the device beacon is deterministically transmitted such that a receiver can easily find and acquire beacon signals as needed. The information defining the device beacon assigned parameters may be broadcasted by the WWAN using control channels. Such broadcasts may be autonomous or in response to a request from a WLAN Access Point or femtocell base station.

Examples of beacon parameters include beacon transmission times and periods as well as subcarrier and frequency information.

The access node 114 derives the system timing 110 either through a backhaul from the system infrastructure 118 or by monitoring the base station downlink signals 122. The WWAN downlink signal 122 from the base station 116 to the access node 114 is shown as a dashed line to illustrate that the signal may or may not be received by the access node 114. Where the access node 114 is femtocell base station, the system timing 110 is typically obtained through backhaul, GPS or the WWAN. In some circumstances where the access node 114 is a WLAN assess point, deriving the timing from WWAN downlink signals 122 may be more efficient than obtaining the system timing directly from the system infrastructure 118.

The reception of the device beacon signal 108 invokes the acquisition of wireless service from the access node 114 by the wireless communication device 106. In the examples discussed, the access node 114 informs the system infrastructure 118 of the detection after detecting the device beacon 108. In response, the system infrastructure 118 transmits a search message 126 to the wireless communication device 106 that adjusts the searching scheme used by the wireless communication device 106 to search for alternate wireless service. Where the wireless communication device 106 is a dual mode device searching for a WLAN, for example, the search message 126 may result in an activation of the WLAN receiver to search for WLAN signals. Where the access node 114 is a base station connected on the same cellular network as the base station 116, the wireless communication device 106 may change search parameters of the searching scheme used to search for alternate base stations in response to the search message 126. Additional information may be processed by the access node 114 and/or the system infrastructure 118 before messages are transmitted by the system infrastructure 118 and/or the wireless communication device 106. As discussed below, for example, the capacity of the access node 114 and the bandwidth requirements of the wireless communication device 106 may be evaluated before invoking a handoff to the access node 114. In some situations, the detection of the device beacon signal may invoke additional procedures or mechanisms. For example, in situations where the access node is not transmitting a pilot signal until services are to be provided, the detection of the beacon invokes the transmission of the pilot signal.

Figure 1C:
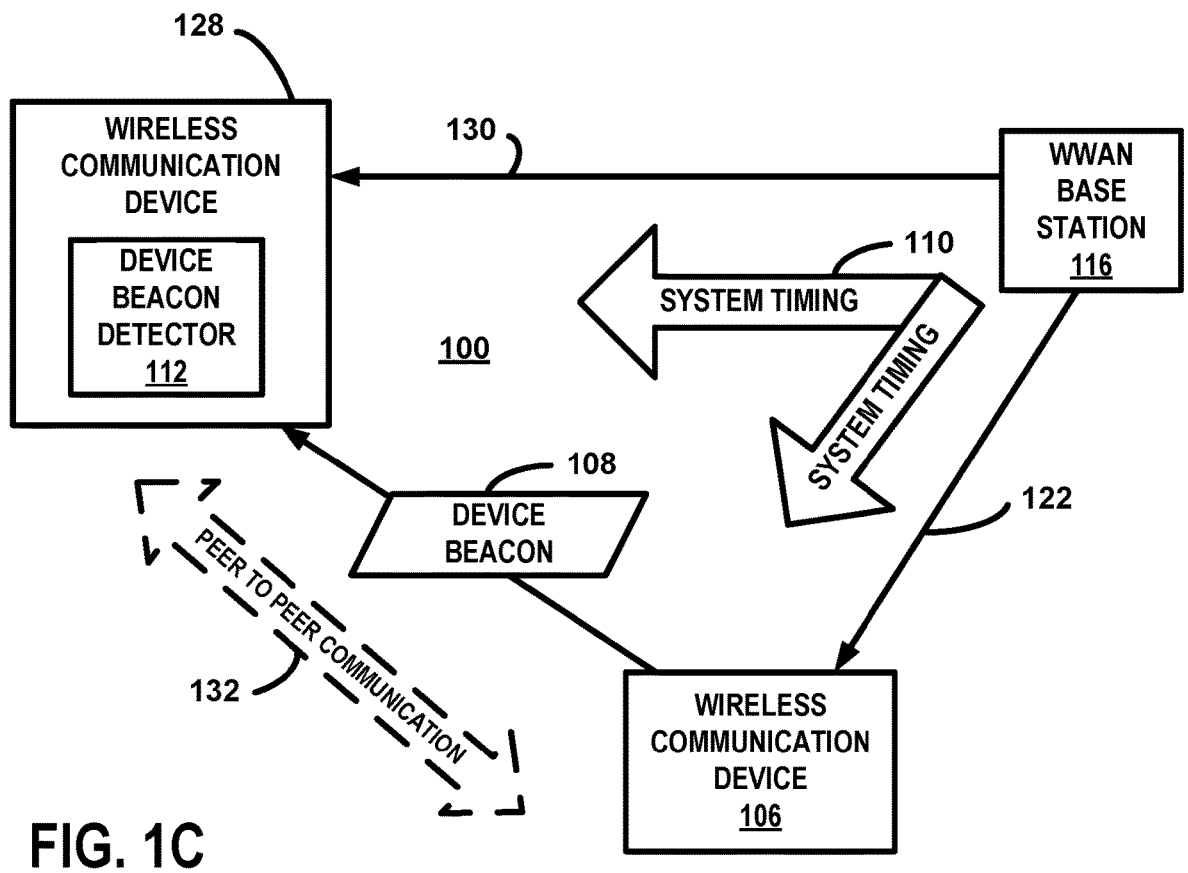
FIG. 1C is a communication system where the transceiver node is a mobile wireless communication device.

FIG. 1C is a block diagram of the communication system 100 where the transceiver node 104 is a mobile wireless communication device 128. The mobile wireless communication device 128 is any mobile or portable device that is capable of receiving WWAN downlink signals 130 and may be, for example, a handset, phone, wireless personal digital assistant (PDA), wireless modem, or wireless laptop computer. In some circumstances, the mobile wireless communication device 128 may be capable of communication on the WWAN 102. In other situations, however, the mobile wireless communication device 128 may include adequate electronics to receive the WWAN downlink signals 122 but may be configured to operate on a different network where the network may use the same or different technology and/or protocol than the WWAN 102. For example, the mobile wireless communication device 128 may be a WLAN device that operates in accordance with WiFi but that also includes WWAN receiver. Further, the mobile wireless communication device 128 may be a multi-mode wireless communication device such as a dual-mode phone capable of operating within a WWAN and a WLAN. Since both of the wireless communication devices 106, 128 receive downlink signals 122, 130 from the WWAN base station 116, the two devices 106, 128 both receive system timing information 110 from the WWAN. Accordingly, the system timing 110 is used as a reference for transmitting and receiving the device beacon 108.

After the beacon detecting wireless communication device 128 detects the device beacon 108, a peer to peer session is established between the wireless communication device 106 and the beacon detecting wireless communication device 128. Peer to peer communication includes peer to peer communication 132 between the two devices 106, 128 without transmitting data through a network. The arrow representing peer to peer communication is shown with dashed lines in FIG. 1C to illustrate that the communications 132 are not established until after the device beacon 108 is detected. The peer to peer session may be established using any of several techniques and signaling schemes. For example, a device detection message may be sent to the WWAN which invokes a session establishment message that is transmitted by the WWAN to the wireless communication device 106. In response to the session establishment message, the wireless communication device 106 transmits and/or receives messages to establish the peer to peer session. In some situations, the beacon detecting wireless communication device 128 sends a message directly to the wireless communication device 106 without using the WWAN.

Figure 2A:
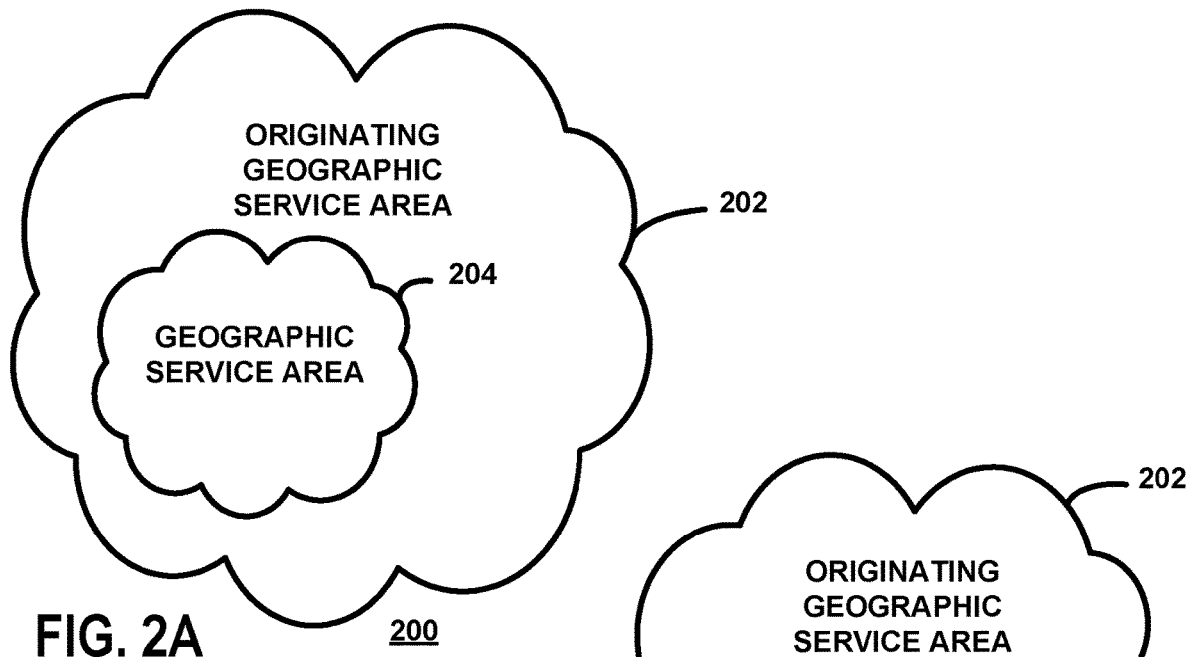
FIG. 2A is an illustration of an exemplary geographical service area relationship provided by an originating base station and detecting base station where the geographic service area of a detecting base station is within an originating geographic service area of the originating base station.
Figure 2B:
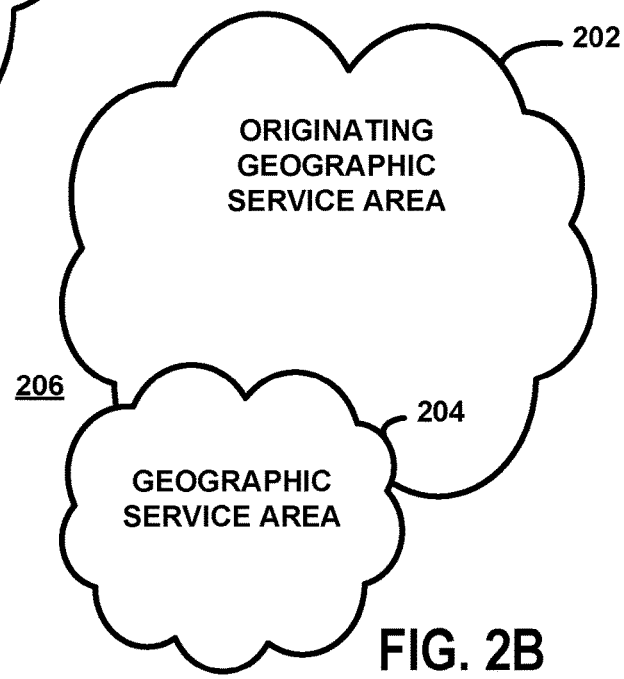
FIG. 2B is an illustration of an exemplary geographical service area relationship provided by the originating base station and the detecting base station where the geographic service area of a detecting base station overlaps with the originating geographic service area of the originating base station.
Figure 2C:
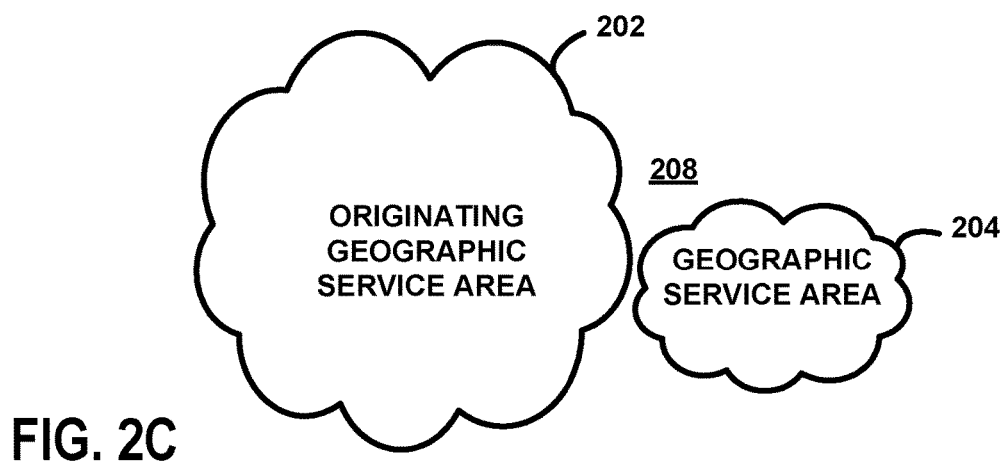
FIG. 2C is an illustration of an exemplary geographical service area relationship provided by the originating base station and the detecting base station where the geographic service area of a detecting base station does not overlap with the originating geographic service area of the originating base station.

FIG. 2A, FIG. 2B and FIG. 2C are depictions of exemplary geographical service area relationships 200, 206, 208 provided by the WWAN 102 and the transceiver node 104. A WWAN geographical service area 202 provided by the WWAN base station 116 and a geographic service area 204 provided by the transceiver node 104 may have any of numerous shapes, sizes, and configurations. Accordingly, the clouds representing the service areas generally illustrate the relationships between the service areas and do not necessarily depict the actual shapes of the service areas. Further, the service areas may contain holes of coverage where service is unavailable. In the interest of clarity and brevity, such features are not illustrated in the figures. In FIG. 2A, the service area 204 of the detecting transceiver node 104 is completely within the service area 202 provided by the WWAN 102. Such service area relationships 200 often occur where some base stations within the communication system 100 provide smaller service regions such as microcell, picocell, and femtocell configurations. A femtocell arrangement, for example, may include a femtocell base station (transceiver node 104) located at a residence where the femtocell is a service area for devices used by device users living at the residence. When the wireless communication devices are outside the service area 204, service is provided by larger macrocells (e.g. reference base station 116). When the authorized wireless communication device is at the residence, however, service is provided by the transceiver node 104 presenting the smaller femtocell service area 204. Further, the relationship 200 is likely to occur where the transceiver node 104 is a wireless communication device 128. In such situations, the geographic service area is a geographic area within which another wireless communication device can engage in a per-to-peer communication session with the wireless communication device 128. Accordingly, in most situations, the service area 204 of the transceiver node 104 will be completely within the service area 202 of the base station 116. In some situations, however, the service area 204 may be partially overlapping with the service area 202 as shown in FIG. 2B or may be non-overlapping but adjacent to the service area 202 as shown in FIG. 2C.

Figure 3A:
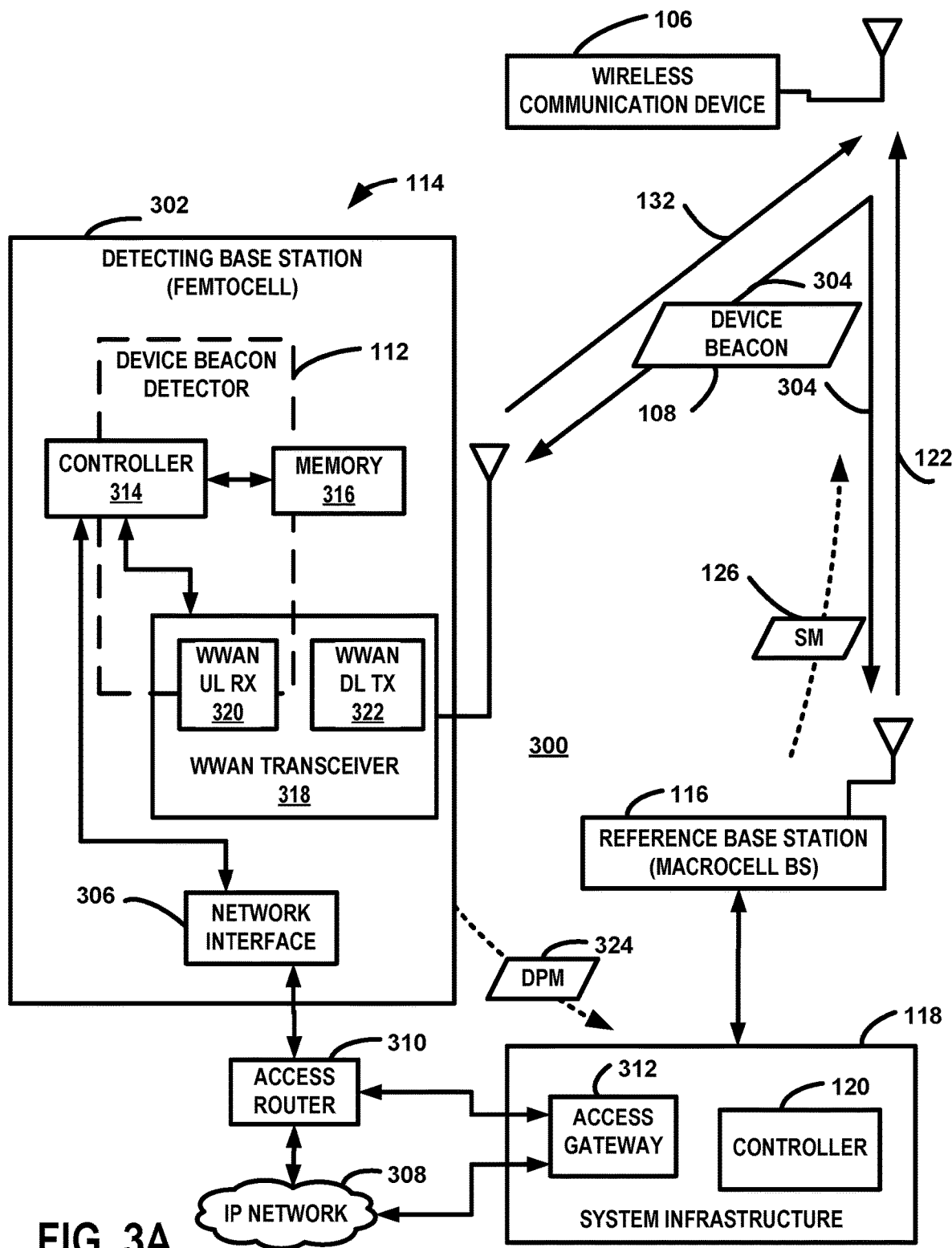
FIG. 3A is a block diagram of a communication system where the transceiver node is a base station and the beacon is transmitted within the WWAN uplink channel.

FIG. 3A is a block diagram of a communication system 300 where the transceiver node 104 (access node 114) is a base station 302 such as a femtocell base station, picocell base station, or microcell base station. The system 300 may be implemented using any variety of communication technologies and cell sizes. For the example discussed with reference to FIG. 3A, the base station 302 provides wireless service within a femtocell and the base station 116 provides service within a macrocell. In the interest of clarity, the base station 302 that detects the device beacon 108 is referred to as the detecting base station 302 and the base station 116 providing the system timing 110 to the wireless communication device 106 is referred to as the reference base station 116. The base stations 302, 116 operate in accordance with OFDM protocols and standards such as IEEE802.16 and 3GPP LTE. Other communication standards and protocols, however, may be used in some circumstances. Examples of other suitable communication standards include CDMA standards such as cdma20001x, 1xEV-DO and W-CDMA, and GSM standards. The term macrocell is used primarily to distinguish this group of diverse technologies from picocells and femtocells that typically have smaller service areas on the order of 100 to 300 feet per base station. Accordingly, the reference base station 116 is any base station that provides wireless communication services within relatively large geographical areas as compared to the geographical service area provided by the base station 302 in the example of FIG. 3A. The functional blocks of FIG. 3A may be implemented using any combination of hardware, software and/or firmware. Two or more of the functional blocks may be integrated in a single device and the functions described as performed in any single device may be implemented over several devices. For example, at least portions of the functions of the system infrastructure 118 and controller 120 may be performed by the base station 116, a base station controller, or an MSC in some circumstances.

The reference base station 116 transmits downlink link (forward) signals 122 to, and receives uplink (reverse link) signals 304 from, one or more wireless communication devices to provide wireless communication service. The wireless communication device 106 may be in any of several states while receiving the WWAN downlink signals that provide system timing. The operational states of the wireless communication device 106 may include idle states, dormant states, active states and other traffic and non-traffic states. The wireless communication device 106 generates and transmits the device beacon 108 in accordance with the system timing. The system timing includes at least the timing reference as well as time slot and channel assignment. For the example discussed with reference to FIG. 3A, device beacon 108 is transmitted at a designated time and channel (subcarrier) within the uplink WWAN time-frequency space. For the example discussed with reference to FIG. 3B below, the device beacon 108 is transmitted outside of the uplink channel but in accordance with the WWAN system timing.

The system infrastructure 118 includes the controller 120 that may be implemented as a mobile switching center (MSC), a combination of an MSC and base station controllers (BSCs), or other similar communication controllers and/or servers. The controller 120 is connected to the base stations 302, 116 through the system infrastructure 118 and manages communications within the system 300. Although the controller 120 is illustrated as part of the system infrastructure 118, it may be part of the base station 116 or collocated with the base station 116. The controller 120 may include, or may be part of, the MSC, BSC or other infrastructure. The controller 120 includes the hardware and software for generating the search message 126 and, for this example, is the same equipment used to generate paging channel messages.

A network interface 306 within the detecting base station 302 facilitates communication with an IP network 308 through an access router 310. The network interface 306 provides packet data communications and facilitates access to the Internet and to an access gateway 312 in the system infrastructure 118 through the access router 310. In some circumstances the access router 310 may be implemented as part of the network interface and the network interface 306 may directly access the Internet. The access router 310 may be connected to several base stations and provides communication management and control functions to the detecting base station 302. In some circumstances, the connection between the access gateway 312 and the base station 302 may include a wireless communication link such as satellite communication link or point-to-point microwave link, for example. Also, in some situations, circuit switched connections may be used to connect the detecting base station 302 to the system infrastructure 118. In a typical arrangement, the detecting base station 302 is connected to the Internet through an Internet Service Provider (ISP) service provided by a digital subscriber line (DSL) or CATV connection. Accordingly, the access router 310 is a DSL modem or cable modem in the typical arrangement. In the example, therefore, the system infrastructure 118 comprises a packet switched core network that includes at least one access gateway 312. The access gateway 312 is a communication interface that allows the base station 302 to communicate with the system infrastructure 118.

The wireless communication device 106 is any type of communication device that is capable of communicating with the base stations 302, 116. The wireless communication device 106, sometimes referred to as an access terminal, may be a wireless modem, a personal digital assistant (PDA), cellular telephone, or other such device. Examples of suitable wireless communication devices are provided below.

In addition to the functions and features discussed herein, the detecting base station 302 operates in accordance with the communication protocols of the communication system 300 and is a femtocell base station. The detecting base station 302 includes a controller 314, memory 316, WWAN transceiver 318, such as cellular transceiver, and the network interface 306 in addition to other devices and software for performing the functions of the base station 302. The cellular transceiver 318 includes an uplink receiver 320 and a downlink transmitter 322. The downlink transmitter 322 transmits WWAN downlink signals 132 to wireless communication devices such as the wireless communication device 106.

In addition to other information, the memory 316 stores communication device identification values corresponding to each wireless communication device 106 that is authorized to receive service from the base station 302. The communication device identification value may include an electronic serial number (ESN), Mobile station Equipment Identifier (MEID) or International Mobile Subscriber Identity (IMSI) or other unique data identifying the wireless communication device 106. An example of a group of identification values stored in memory 316 includes a collection of ESNs corresponding to the communication devices of the family members of a household where the base station 302 provides service. The identification values may be stored at the base station 302 using any of numerous techniques. An example of a suitable method of storing the values includes storing the values during an initialization procedure performed when the base station 302 is installed. The identification values may be provided, at least partially, by the core network or the macrocell base station 116. In some implementations, the identification values may be omitted or the base station 302 may allow communication devices that do not have corresponding identification values stored at the base station 302 to receive service from the base station 302.

During operation, the detecting base station 302 monitors, at least periodically, a device beacon channel 124 which is a wireless channel that may include the device beacon signal 108. For the example of FIG. 3A, the device beacon signal 108 is within a sub-carrier time slot. In some circumstances, no other channel is assigned for the other frequencies during the time slot assigned for the device beacon. Such a scenario increases the likelihood of the detecting base station 302 to detect the device beacon signal 108 since all of the device beacon energy is concentrated at a particular frequency with no other concurrently transmitted signals present. The assignment of subcarriers for the beacon is established at the base band frequencies. Accordingly, the actual transmitted signal at the radio frequencies (RF) may include a wideband signal. The device beacon detector 112 is formed by at least portions of the controller 314, memory 316 and uplink receiver 320. Since the detecting base station 302 is synchronized with the system infrastructure 118, the cellular transceiver 318 has adequate system timing information to determine the time slot boundary and the timing of uplink signals. The timing facilitates non-blind beacon detection at the receiver. With appropriate beacon designs, blind detection may also be performed. In some circumstances, the device beacon detector 112 may only search for beacons signals transmitted from wireless communication devices that are authorized to use the detecting base station 302. An authorized list of serial numbers or other device identifiers are stored in memory 316 at the detecting base station 302.

In response to detecting the device beacon signal 108, the detecting base station 302 sends a device proximity message 324 to the controller 120 which invokes the reference base station 116 to transmit the search message 126 to the wireless communication device 106. For this example, the controller 314 determines if the device beacon signal 108 is successfully received at the detecting base station 302. If the signal can be received, the controller 314 determines that the wireless communication device 106 is sufficiently close to receive service from the base station 302. In some cases, the device beacon signal may be detected and received even though the wireless communication device 106 is not within the service area of the base station 302. In these circumstances, the wireless communication device 106 may unsuccessfully attempt to acquire service from the base station 302 after receiving the search message 126 from the reference base station 116. The controller 314 determines, or at least estimates, the proximity of the authorized wireless communication device 106 to the detecting base station 302 based on one or more characteristics of the uplink signal. In the exemplary embodiment, the detection of an uplink signal from the communication device 106 is sufficient to determine that the communication device 106 is within a proximity range. The proximity is used to determine whether the communication device 106 is possibly within range of the base station 302 and at least possibly able to receive communication service from the base station 302. Therefore, the controller 314 at least determines whether the communication device 106 is possibly within range of the base station 302. If the controller 314 determines that the wireless communication device 106 is possibly in range, the device proximity message 324 is sent to the controller 120 in the system infrastructure 118 which results in the transmission of the search message 126 to the wireless communication device 106.

The controller 314 may determine whether to transmit the device proximity message 324 based on factors other than proximity of the wireless communication device 106 or the detection of the device beacon signal 108. For example, factors may include the available capacity of the detecting base station 302, core network requirements, required bandwidth of the wireless communication device communications, and availability of other base stations or communication service providers in the area. Accordingly, the base station 302 may not transmit the device proximity message 324 even if the wireless communication device 106 is within range in some circumstances. In some situations, the device proximity message 324 is transmitted every time a wireless communication device 106 is detected by the detecting base station 302 and the system infrastructure 118 determines whether to transmit the search message 126.

The device proximity message 324 is generated by the controller 314 and transmitted through the network interface 306, through the IP network 308 and/or the access router 310 to the access gateway 312. The access gateway 312 routes the device proximity message 324 through the system infrastructure 118 to the controller 120. For the discussed example, the controller 120 is the same equipment that is used to generate paging messages to the wireless communication device 106. The controller 120 receives the device proximity message 324 and extracts the appropriate information. In response to the device proximity message 324, the controller 120 generates the search message 126 which is transmitted from the reference base station 116 to the wireless communication device 106. The search message 126 triggers an adjustment of the wireless communication device searching scheme that the wireless communication device 106 employs for searching for alternate base stations. The wireless communication device 106, therefore, changes one or more searching parameters of the searching scheme in response to receiving the search message 126. Any combination of numerous parameters can be adjusted where the adjustments increase the likelihood of the wireless communication device 106 detecting a signal transmitted by the detecting base station 302. The search message 126 may result in a change in the search scheme to devote more resources to search for an alternate base station or may result in a change in resources to search for the specific detecting base station 302. In some circumstances, the search message 126 may specifically instruct the wireless communication device 106 to search for the detecting base station 302.

For the example, the search message 126 is transmitted using the paging channel. Any suitable downlink channel monitored by the wireless communication device 106 during the non-traffic state, however, may be used. The wireless communication device 106 searches for signals transmitted by alternate base stations in accordance with the searching scheme. Alternate base station signals from frequencies and/or technologies different than those by the base station 116 may be searched. The wireless communication device 106 searches for pilot signals although other signals may be searched. For example, the wireless communication device 106 may search for base station beacon signals in some situations. Examples of searching parameters include a total time period for searching, time periods for searching particular frequencies, the frequency of searching, the frequency of searching particular frequencies, the groups of frequencies searched, the portions of channels searched, the receiver settings for searching and type of communication technology. Other searching parameters will be apparent to those skilled in the art based on these teachings. As discussed in further detail below with reference to FIG. 4A, therefore, the search message 126 includes information that results in an adjustment of one or more of the search parameters.

For the present example, device proximity message 324 are sent only in response to receiving device beacon signals 108 from authorized users of the detecting base station 302. The search message 126 is sent to the wireless communication device 106 in response to receiving the device proximity message 324 at the controller 120. In some situations, however, additional criteria may be evaluated before sending the device proximity message 324, the search message 126, or before sending both. As discussed below, for example, the detecting base station 302 may evaluate one or more parameters to determine the proximity of the wireless communication device 106 to the detecting base station 302 and only send the device proximity message 324 if the calculated proximity is less than a threshold. Also, the controller 120 may evaluate system conditions and refrain from sending the search message 126 if certain system conditions are not met.

Examples of data that may be evaluated by the detecting base station 302 include the capacity of the detecting base station 302, bandwidth requirements of the wireless communication device 106 and a calculated or estimated proximity of the wireless communication device 106 to the detecting base station 302. Accordingly, the detecting base station 302 may evaluate a characteristic of the device beacon signal 108 to determine whether to transmit the device proximity message 324. In the example, the reception of the device beacon signal 108 by the UL receiver 320 is sufficient to determine that the wireless communication device 106 is present and that the device proximity message 324 should be transmitted. In other circumstances, other signal characteristics may be evaluated to determine the proximity. Therefore, a characteristic of the device beacon signal 108 may be any of numerous parameters with any of numerous thresholds depending on the particular implementation and the characteristic may be whether the device beacon signal 108 is detectable by the base station receiver 320. Examples of other characteristics include a signal to noise ratio (SNR), bit error rate (BER), power level, signal propagation time, and presence of particular data. An example of technique for determining the proximity is discussed in U.S. patent application Ser. No. 11/565,266 entitled "APPARATUS, SYSTEM AND METHOD FOR MANAGING WIRELESS LOCAL AREA NETWORK SERVICE TO A MULTI-MODE PORTABLE COMMUNICATION DEVICE", filed on Nov. 30, 2006, and incorporated by reference in its entirety herein.

The device proximity message 324 and search message 126 may have any of numerous relationships and each message may be dependent on the information within, the format of, and/or other characteristics of the other message. For example, the device proximity message 324 and the search message 126 may be the same message in some circumstances. Such a situation occurs where the device proximity message 324 is an SMS message sent directly to the wireless communication device 106 indicating that the device beacon signal 108 transmitted from the device 106 has been detected by the detecting base station 302. The wireless communication device 106 interprets the device proximity message 324 as a search message 126 indicating that the search parameters should be changed. Transmitting the search message 126 within the paging channel, however, allows for minimizing power consumption since additional resources are not invoked to receive SMS messages.

After receiving the search message 126, the wireless communication device 106 searches for an alternate base station in accordance with the adjusted search scheme. In response to the search message 126, the wireless communication device 106 activates the appropriate circuitry to receive signals transmitted by the detecting base station 302 such as a beacon pilot signal or communication pilot signals. In most situations, such circuitry is periodically activated in accordance with the search scheme to the reception of the search message and the search message does not directly trigger the activation of the receive circuitry. The adjusted search scheme, however, may result in more frequent activation of the circuitry. The detecting base station 302 generates and transmits a communication pilot signal which provides control and timing information to the wireless communication device 106. In some circumstances, the detecting base station 302 may refrain from transmitting pilot signals until a wireless communication device 106 is detected and the proximity message 304 is sent. In addition, the detecting base station 302 may transmit a base station beacon pilot signal. After the detecting base station 302 is found by the wireless communication device 106, the wireless communication device 106 may engage in a handoff procedure where, after a determination that the wireless communication device 106 should be handed off to the detecting base station 302, the system 300 establishes wireless service to the wireless communication device 106 from the detecting base station 302.

Figure 3B:
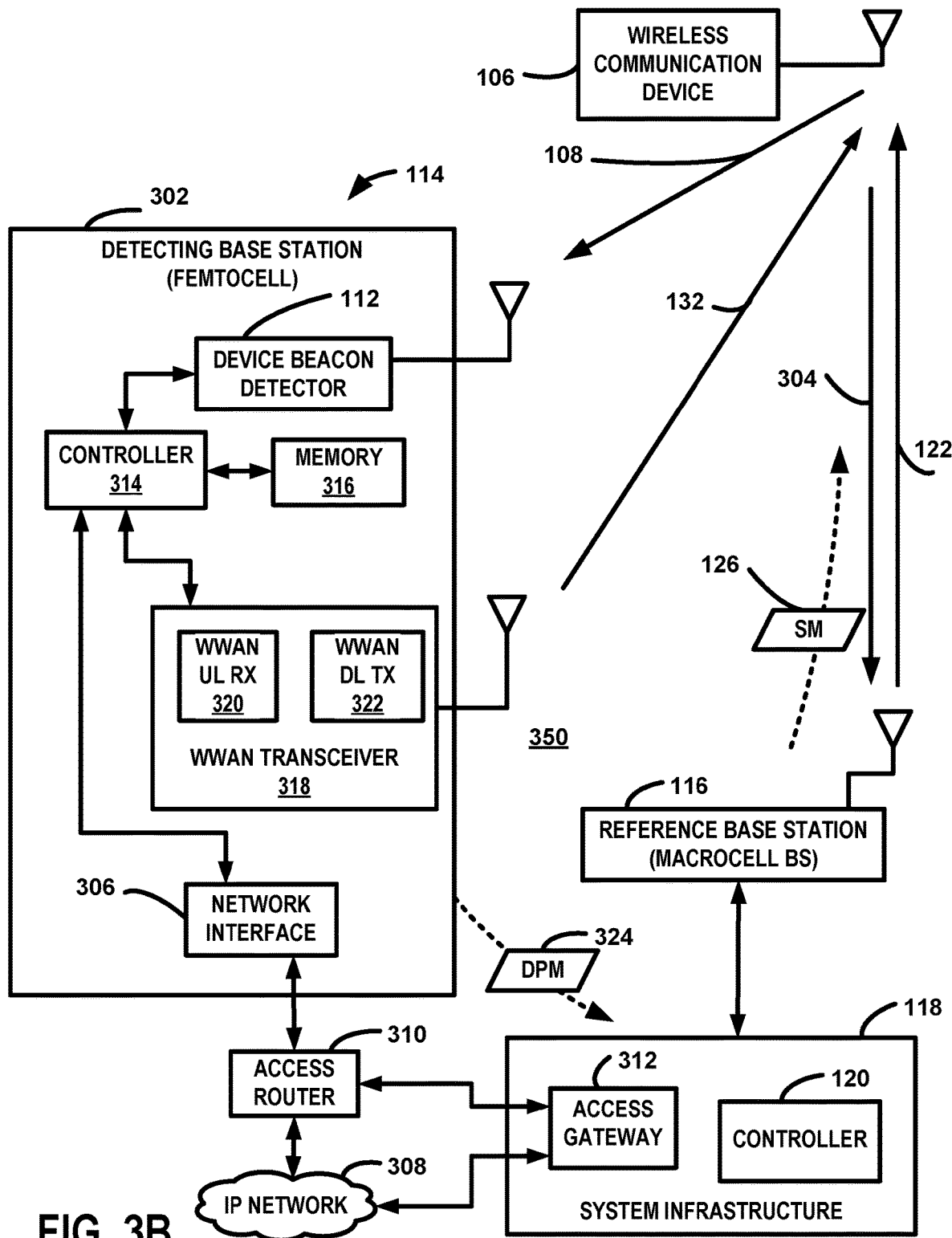
FIG. 3B is a block diagram of a communication system where the transceiver node is a base station the beacon is transmitted outside of the WWAN uplink channel.

FIG. 3B is a block diagram of a communication system 350 where the transceiver node 104 (access node 114) is a base station 352 such as a femtocell base station, picocell base station, or microcell base station and where the device beacon is transmitted outside of the WWAN uplink frequency band. The system 350 is similar to the system 300 discussed with reference to FIG. 3A except that the detecting base station 302 includes a device beacon detector 112 that detects device beacons 108 outside of the WWAN uplink frequency band. For the example of FIG. 3B, therefore, the wireless communication device 106 transmits a device beacon with a frequency band outside of the WWAN uplink frequency band. Examples of suitable frequency bands include Bluetooth frequency bands and WLAN frequency bands. The device beacon detector 112 includes a receiver that can receive the signals transmitted within the device beacon frequency band. After detecting the device beacon, the base station 302 may perform the functions discussed above with reference to FIG. 3A. In some situations, detecting base station may not be transmitting or receiving any WWAN signals until after detection of the device beacon 108. Accordingly, the WWAN pilot signal 132 may be transmitted in response to the detection of the device beacon signal 108.

Figure 4A:
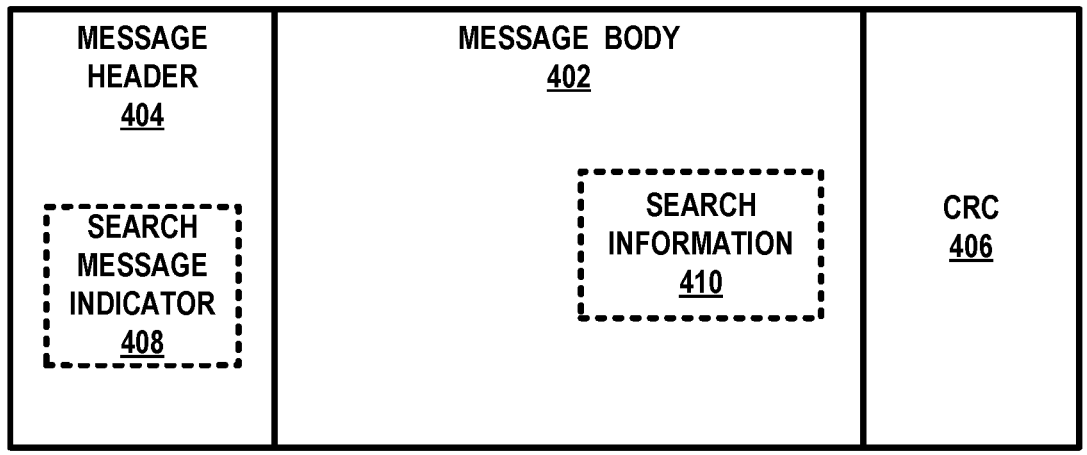
FIG. 4A is a block diagram of an example of the search message.

FIG. 4A is a block diagram of the search message 126 where the search message 126 is transmitted within a paging channel message 400. The search message 126 may contain any of several types of information, may have any of numerous formats, and may be transmitted using a variety of channels and signals. For this example, the search message 126 is contained within the message body 402 of a paging channel message 400 in accordance with one or more OFDMA standards. The paging channel is allocated a set of time-frequency bins where each paging channel message 400 includes a header field 404, a message body 402, and a cyclic redundancy check (CRC) 406.

For the example, a search message indicator 408 may be included in the header 404. The header 404 may also include message length information. Typically, length is kept constant for paging messages.]. The search message indicator 408 is any number of bits that indicates to the wireless communication device 106 that the paging message is a search message 126. The search information includes information related to the search scheme adjustment. In some cases, the search message indicator 408 is sufficient to notify the wireless communication device 106 of a need to adjust the searching scheme and the search information 410 may be omitted. The search information, however, may include any of numerous parameters related to the adjusting the searching scheme. As discussed below in further detail, the search information 410 may include information that identifies one or more base stations that should be searched or frequencies that should be searched.

The search message 126 includes information that results in an adjustment of one or more of the search parameters. In some situations, the search message 126 may only indicate that a more robust search should be performed and the wireless communication device 106 adjusts searching resources in response. The search information 410 may be omitted in this case. The search change may be a preprogrammed adjustment or a dynamic adjustment based on other criteria observed by the wireless communication device 106. For example, if some detection of energy had been recently observed in a particular channel, the adjustment in search parameters may be adjusted to more heavily target resources to searching that particular channel as compared to the resources that would have been applied to the channel if the search message were not received. In an example where the search scheme is preprogrammed that is not based on other criteria, the wireless communication device may search in accordance with a scheme utilized prior to receiving the search message 126 but may increase search times or reduce the periods between searches.

The search message 126 may also include search information 410 identifying a group of base stations that may be available. Such an indication may be a specific identifier specifically identifying one or base stations or may be a general identification identifying a group of base stations such as an identifier indicating all authorized femtocell base stations. Since the wireless communication device 106 includes a list of all femtocell base stations that the device is authorized to access, a general identifier will provide sufficient information for identifying specific base stations.

In some circumstances, the search message 126 may indicate specific frequencies. A pilot frequency or beacon frequency of the detecting base station 302 may be identified, for example.

The wireless communication device 106 extracts the information from the search message 126 and adjusts the searching scheme in accordance with search message 126. The adjustment may include any of numerous parameter changes where some examples include adjusting one or more of the following: frequencies searched, channels searched, period between searches, period between searches of specific frequencies, time period of search, time period for search at specific frequencies, search offsets, location of starting search in the search-space, and searcher receiver settings. In circumstances where the wireless communication device 106 searches for service from a system utilizing a different communication technology and universal searcher is used, similar parameters may be adjusted. Where a new searcher is invoked for the alternate technology base station, the parameters may also include the timing of the activation of the new searcher.

Figure 4B:
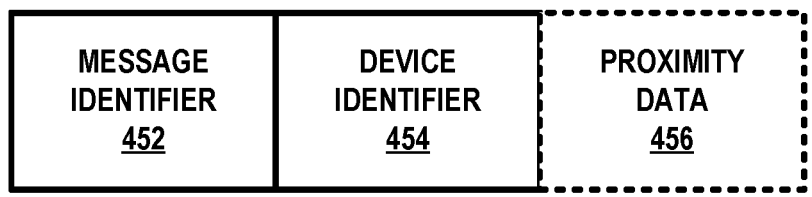
FIG. 4B is block diagram of an example of the device proximity.

FIG. 4B is block diagram of a device proximity message 324 that includes a message identifier 452, and a device identifier 454. In some cases, proximity data 456 may also be included. The proximity data 456 is illustrated with dashed lines to indicate that this feature is optional. The device proximity message 324 may have any of numerous formats and may be sent using any suitable signaling method. The message identifier 452 includes any combination of data that indicates to the controller 120 that the message 450 is a device proximity message 324. Accordingly, the message identifier 452 may be a single bit flag in some circumstances. The device identifier 454 includes data that identifies the wireless communication device 106 that has been detected by the detecting base station 302. One example of a device identifier 454 is a device serial number.

Figure 5:
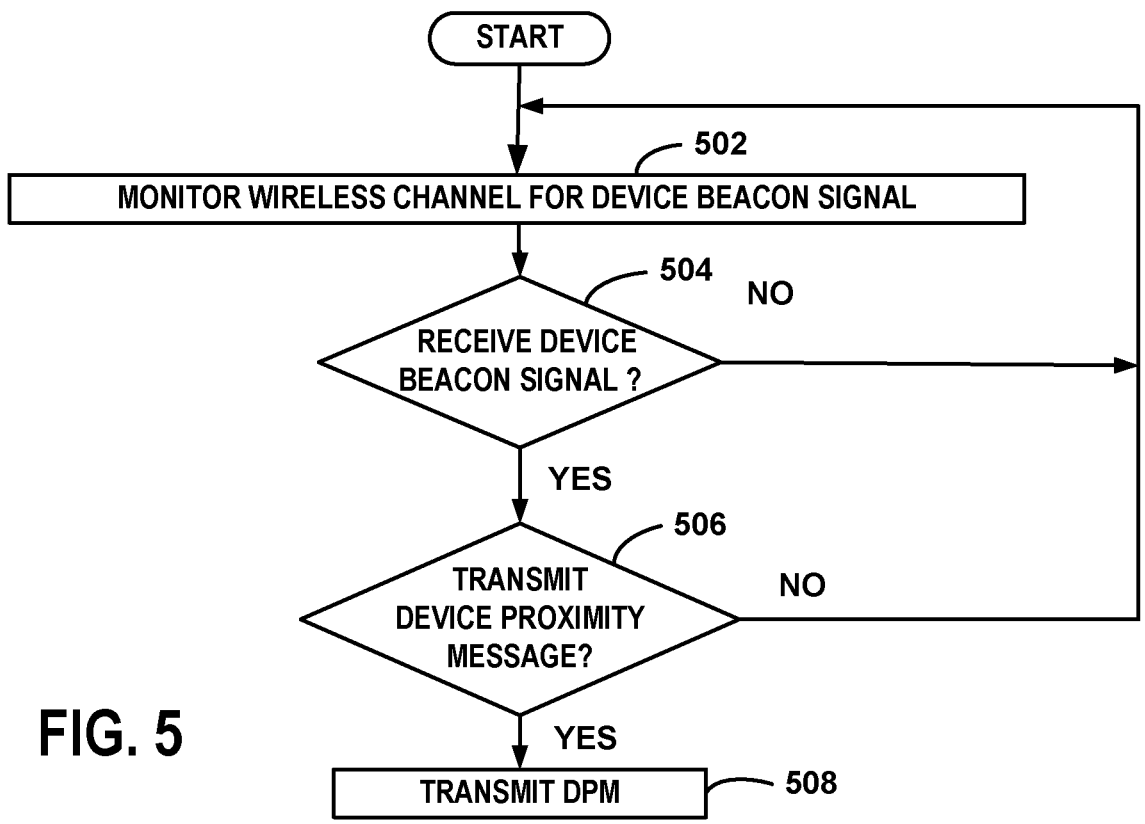
FIG. 5 is flow chart of a method of managing wireless service to a wireless communication device performed at the detecting base station.

FIG. 5 is flow chart of a method of managing wireless service to a wireless communication device 106 performed at the detecting base station 302. The method may be performed by any combination of hardware, software and/or firmware. The order of the steps discussed below may be varied and one or more steps may be performed simultaneously in some circumstances. In the exemplary embodiment, the method is performed, at least in part, by executing code on the controller 314 in the detecting base station 302.

At step 502, the wireless channel that may contain a device beacon signal 108 is monitored. The uplink receiver 320 attempts to demodulate and/or decode incoming signals within the wireless communication channel. The WWAN system timing is applied to receive the monitor the beacon channels. In this example, the uplink receiver 320 is tuned to decode any uplink signals 304 transmitted from any of the communication devices 106 in the user list stored in memory 316. The long code masks derived with the device identification values are applied to incoming signals until an incoming device beacon signal 108 is detected.

At step 504, it is determined whether a device beacon signal 108 has been detected. In this example, the controller 314 determines that device beacon signal has been received if an incoming uplink signal can be decoded and determined to be a beacon signal transmitted from an authorized wireless communication device 106. If a device beacon signal 108 has been received, the method continues at step 506. Otherwise, the method returns to step 502 to continue monitoring the device beacon channel.

At step 506, it is determined whether the device proximity message 324 should be transmitted. In some situations, step 506 can be omitted and the device proximity message 324 may be transmitted when the device beacon signal 108 is detected. This procedure is discussed with reference to FIG. 8. In other situations, however, additional processing or communication is invoked before the device proximity message 324 is transmitted. For example, system conditions of the detecting base station 302, other base stations, the core network, and/or alternate networks can be evaluated to determine whether a handoff to the detecting base station 302 is desired. An example of such a procedure is discussed with reference to FIG. 9. If it is determined that the device proximity message 324 should be transmitted, the method continues at step 508. Otherwise, the method returns to step 502. In some circumstances, a response may be sent to the beacon-transmitting wireless communication device. An ACK may be sent, for example, with an appropriate message that assists the wireless communication device in finding the detecting-device. This ACK-message can be transmitted in WWAN or WLAN frequency or any other frequency (predefined)].

At step 508, the device proximity message 324 is sent to the system infrastructure. The device proximity message 324 at least identifies the wireless communication device 106 and indicates that the wireless communication device 106 may be within, or near, the service area of the detecting base station 302.

Figure 6:
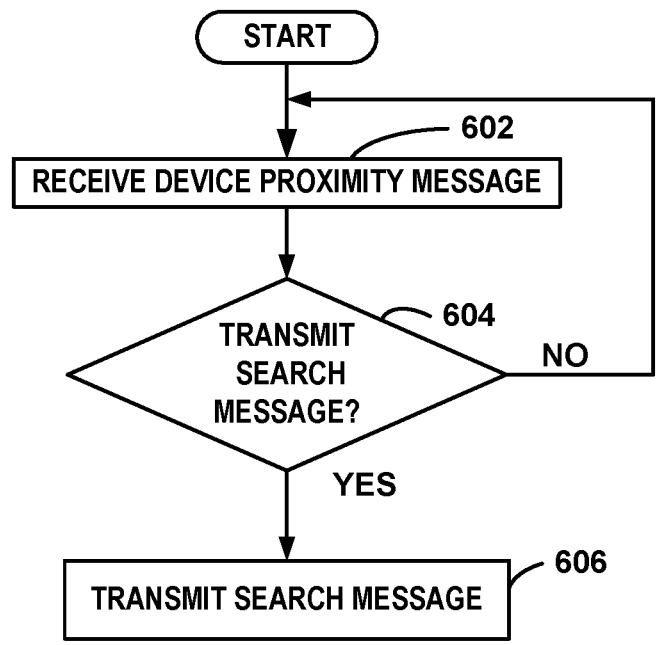
FIG. 6 is a flow chart of a method of managing communication services to the wireless communication device performed in the system infrastructure.

FIG. 6 is a flow chart of a method of managing communication services to the wireless communication device 106 performed in the system infrastructure 118. The method may be performed by any combination of hardware, software and/or firmware. The order of the steps discussed below may be varied and one or more steps may be performed simultaneously in some circumstances. In this example, the method is performed, at least in part, by executing code on the controller 120 in the system infrastructure 118.

At step 602, the device proximity message 324 is received from the detecting base station 302. As described above, the device proximity message 324 is sent through the IP network 308 and routed through the access gateway 312 to the controller 120. The controller 120 extracts information from the device proximity message 324 which includes at least information identifying the wireless communication device 106.

At step 604, it is determined whether the search message 126 should be transmitted to the wireless communication device 106. The controller 120 may evaluate any number of factors in accordance with known techniques for managing handoffs and communication resources in determining whether to transmit the search message. In some circumstances, the threshold may be relatively low and the controller 120 determines to send the search message 126 solely in response to receiving the device proximity message 324. In other circumstances, the controller 120 may apply the same criteria as used to determine whether to handoff a device from one base station to another. Some examples of criteria that may be evaluated by the controller 120 include bandwidth requirements, capacity of the base stations, QoS levels priority levels, and costs. If the controller 120 determines that the search message 126 should be sent, the procedure continues at step 606. Otherwise, the method returns to step 602.

At step 606, the search message 126 is generated and transmitted to the wireless communication device 106. The controller 120 generates a search message 126 in accordance with page messaging techniques. As discussed above, the search message 126 includes information for adapting the search parameters of the base station searching scheme used by the wireless communication device 106. When the invoking the changes contained in the search message 126, the wireless communication device 106 increases the likelihood of detecting the base station 302 in a shorter time than if the changes are not made. The search message 126 is transmitted from the reference base station 116.

Figure 7:
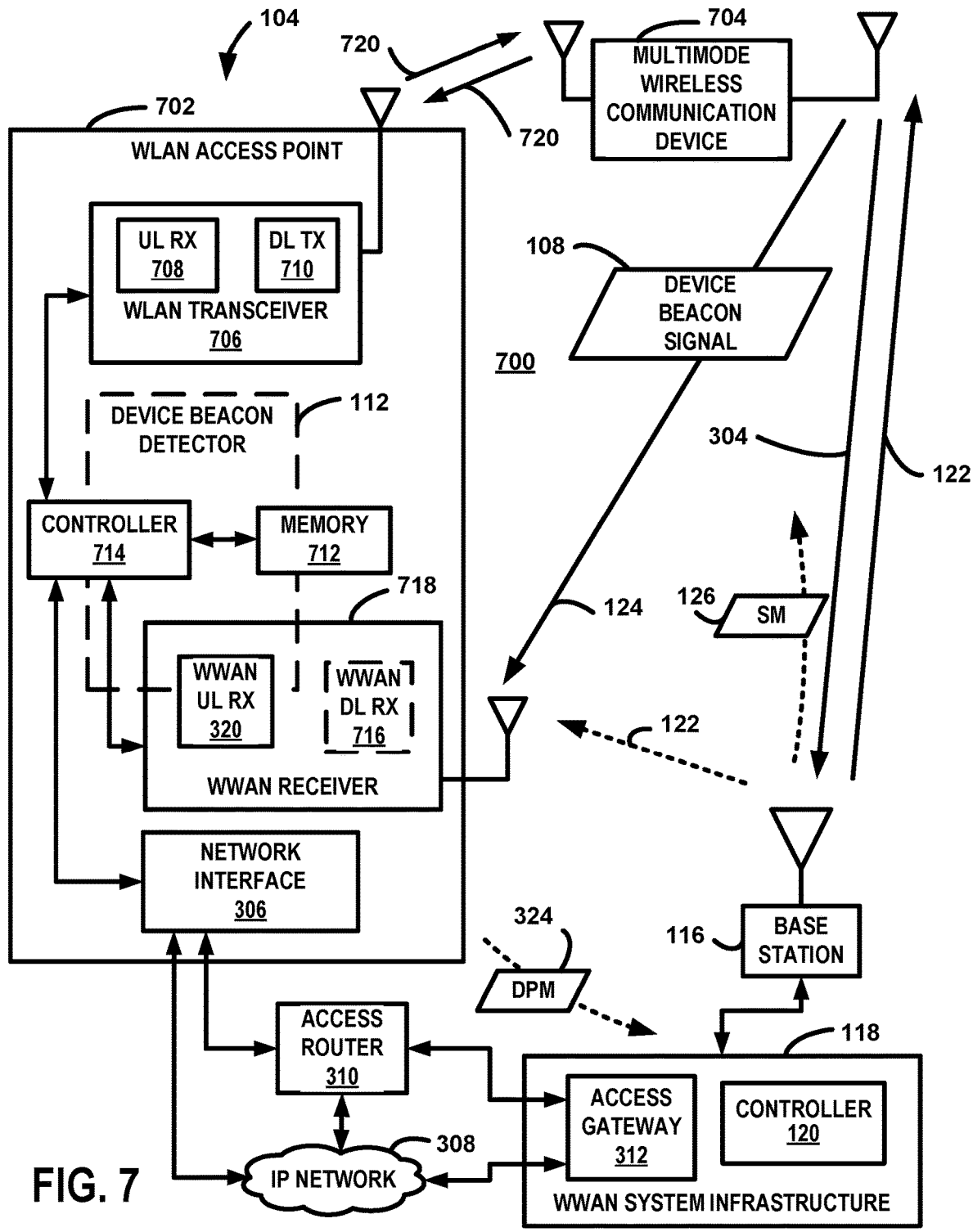
FIG. 7 is block diagram of a communication system where the transceiver node is a WLAN access point and the wireless communication device is a multimode wireless communication device.

FIG. 7 is a block diagram of a communication system 700 where the transceiver node 104 is a WLAN access point 702 and the wireless communication device 106 is a multimode wireless communication device 704. The system 700 may be implemented using any variety of communication technologies and cell sizes. For the example discussed with reference to FIG. 7, the WLAN access point 702 provides WLAN wireless service within a WLAN service area and the base station 116 provides cellular service within a macrocell. The WLAN access point 702 operates in accordance with a WLAN protocol such as WiFi protocol. The functional blocks of FIG. 7 may be implemented using any combination of hardware, software and/or firmware. Two or more of the functional blocks may be integrated in a single device and the functions described as performed in any single device may be implemented over several devices. For example, at least portions of the functions of the access router 310 may be performed by the base station network interface 306 within the WLAN access point 702 in some circumstances.

The base station 116 transmits downlink (forward link) signals 122 to, and receives uplink (reverse link) signals 304 from, one or more wireless communication devices to provide wireless communication service. The multimode wireless communication device 704 may be in any of several states while receiving the WWAN downlink signals that provide system timing. The wireless communication device states may include idle states, dormant states, active states and other traffic and non-traffic states. The wireless communication device 704 generates and transmits the device beacon in accordance with the system timing and a time and channel assignment. For the example discussed with reference to FIG. 7, the device beacon 108 is transmitted at a designated time and channel within the uplink WWAN time-channel space. As discussed below with reference to FIG. 8, the device beacon may be transmitted outside the WWAN channels by the multimode wireless communication device in some circumstances.

A WLAN transceiver 706 within the WLAN access point 702 facilitates wireless interface with one or more multimode wireless communication devices 704. The WLAN transceiver 706 includes a WLAN receiver 708 for receiving WLAN uplink signals and a WLAN transmitter 710 for transmitting WLAN downlink signals in accordance with the WLAN protocol.

The multimode wireless communication device 704 is any type of communication device that is capable of communicating with the WLAN access point and at least receiving WWAN downlink signals from the base station 116. For the example of FIG. 7, the multimode wireless communication device 704 is capable of receiving, at least non-simultaneously, wireless service from both the WWAN and WLAN systems. The wireless communication device 704, sometimes referred to as an access terminal, may be a wireless modem, a personal digital assistant (PDA), cellular telephone, or other such device.

The system infrastructure 118 includes the controller 120 that may be implemented as a mobile switching center (MSC), a combination of an MSC and base station controllers (BSCs), or other similar communication controllers and/or servers. The controller 120 is connected to the base station 116 through the system infrastructure 118 and manages communications at least on the WWAN system. A network interface 306 within the WLAN access point 702 facilitates communication with an IP network 308 through an access router 310. The network interface 306 provides packet data communications and facilitates access to the Internet and to an access gateway 312 in the system infrastructure 118 through the access router 310. In some circumstances the access router 310 may be implemented as part of the network interface 306 and the network interface 306 may directly access the Internet. The access router 310 may be connected to several access points. In some circumstances, the connection between the access gateway 312 and the access point 702 may include a wireless communication link such as satellite communication link or point-to-point microwave link, for example. Also, in some situations, circuit switched connections may be used to connect the access point 702 to the system infrastructure 118. In a typical arrangement, the WLAN access point 302 is connected to the Internet through an Internet Service Provider (ISP) service provided by a digital subscriber line (DSL) or CATV connection. Accordingly, the access router 310 is a DSL modem or cable modem in the typical arrangement. In the example, therefore, the system infrastructure 118 comprises a packet switched core network that includes at least one access gateway 312. The access gateway 312 is a communication interface that allows the access point 702 to communicate with the system infrastructure 118. The WLAN access point receives system timing information form the WWAN through the network interface for this example. In some situations, a WWAN downlink receiver 716 can be used to intercept WWAN downlink signals to derive the system timing. The block representing the WWAN DL RX 716 is shown within dashed lines to indicate that the WWAN DL RX 716 is optional.

For the example of FIG. 7, the device beacon signal 108 is transmitted within a WWAN uplink channel and the device beacon detector 112 is formed, at least partially by a WWAN receiver 718, a controller 714 and a memory 712. The WWAN receiver 718 is at least periodically tuned to the appropriate WWAN uplink channel in accordance with the system timing to monitor the device beacon channels.

In addition to other information, the memory 712 stores communication device identification values corresponding to each communication device 704 that is authorized to receive service from the access point. The communication device identification value may include an electronic serial number (ESN), Mobile station Equipment Identifier (MEID) or International Mobile Subscriber Identity (IMSI) or other unique data identifying the wireless communication device 704. In some implementations, the identification values may be omitted or the access point 702 may allow communication devices that do not have corresponding identification values stored at the access point 702 to receive service from the access point 702.

During operation, the access point 702, monitors, at least periodically, a device beacon channel 124 which is a wireless channel that may include the device beacon signal 108. For the example of FIG. 7, the device beacon signal is transmitted within a sub-carrier time slot. In some circumstances, the time slot is not assigned for any other communications for any frequency. Although the device beacon detector 112 is formed by at least portions of the controller 714, memory 712 and WWAN receiver 718, separate hardware and/or software may be sued to implement the device beacon detector in some cases. Since the WLAN access point receives the WWAN system timing from the system infrastructure 118, the WWAN receiver 718 has adequate system timing information to determine the time slot boundary and the timing of uplink signals. In some circumstances, the device beacon detector 112 may only search for beacons signals transmitted from wireless communication devices that are authorized to use access point as mentioned above. An authorized list of serial numbers or other device identifiers are stored in memory 712 at the WLAN access point.

In response to detecting the device beacon signal 108, the WLAN access point 702 sends a device proximity message 324 to the controller 120 which invokes the base station 116 to transmit the search message 126 to the wireless communication device 106. The controller 714 determines if the device beacon signal 108 is successfully received at the WLAN access point 702. If the signal can be received, the controller 714 determines that the wireless communication device 106 is sufficiently close to receive service from the access point 702. The controller 714 determines, or at least estimates, the proximity of the authorized wireless communication device 106 to the access point 702 based on one or more characteristics of the uplink signal. In the exemplary embodiment, the detection of an uplink signal from the communication device 106 is sufficient to determine that the communication device 106 is within a proximity range. The proximity is used to determine whether the communication device 106 is possibly within range of the WLAN access point and at least possibly able to receive communication service from the WLAN access point. Therefore, the controller 714 at least determines whether the communication device is possibly within range of the access point 702. If the controller determines that the wireless communication device is possibly in range, the device proximity message 324 is sent to the controller 120 in the system infrastructure 118 which results in the transmission of the search message 126 to the wireless communication device 106.

The controller 714 may determine whether to transmit the device proximity message 324 based on factors other than proximity of the wireless communication device 106 or the detection of the device beacon signal 108. For example, factors may include the available capacity of the access point, core network requirements, required bandwidth of the wireless communication device communications, and availability of other, access points, base stations or communication service providers in the area. Accordingly, the access point 702 may not transmit the device proximity message 324 even if the wireless communication device 106 is within range in some circumstances. In some situations, the device proximity message 324 is transmitted every time a wireless communication device is detected by the access point and the system infrastructure 118 determines whether to transmit the search message 126.

The device proximity message is generated by the controller 714 and transmitted through the network interface 306, through the IP network 308 and/or the access router 310 to the access gateway 312. The access gateway 312 routes the device proximity message through the system infrastructure 118 to the controller 120. For the discussed example, the controller 120 is the same equipment that is used to generate paging messages to the wireless communication device 106. The controller 120 receives the device proximity message and extracts the appropriate information. In response to the device proximity message 324, the controller 120 generates the search message 126 which is transmitted from the base station 116 to the wireless communication device 106. The search message 126 triggers an adjustment of the wireless communication device searching scheme that the wireless communication device 106 employs for searching for access points. In the example of FIG. 7, the multimode wireless communication device 704 activates a WLAN receiver to search for WLAN signals. In some circumstances, the search message 126 may specifically instruct the wireless communication device 704 to search for the access point and/or provide specific frequencies, channels or other information to assist the device 704 to search for the access point. For the example, the search message 126 is transmitted using the paging channel. Any suitable downlink channel monitored by the wireless communication device 704, however, may be used.

For the present example, the device proximity message 324 is sent in response to receiving device beacon signal 108 from an authorized user of the access point 702. The search message 126 is sent to the wireless communication device 106 in response to receiving the device proximity message 324 at the controller 120. In some situations, however, additional criteria may be evaluated before sending the device proximity message 324, the search message 126, or before sending both. As discussed above, for example, the access point 702 may evaluate one or more parameters to determine the proximity of the wireless communication device 106 to the access point and only send the device proximity message 324 if the calculated proximity is less than a threshold. Also, the controller 120 may evaluate system conditions and refrain from sending the search message 126 if certain system conditions are not met.

Examples of data that may be evaluated by the access point 702 include the capacity of the access point, bandwidth requirements of the wireless communication device 106 and a calculated or estimated proximity of the wireless communication device 106 to the access point 702. Accordingly, the access point 702 may evaluate a characteristic of the device beacon signal 108 to determine whether to transmit the device proximity message 324. In the example, the reception of the device beacon signal 108 by the WWAN UL receiver 320 is sufficient to determine that the wireless communication device 704 is present and that the device proximity message should be transmitted. In other circumstances, other signal characteristics may be evaluated to determine the proximity. Therefore, a characteristic of the device beacon signal 108 may be any of numerous parameters with any of numerous thresholds depending on the particular implementation and the characteristic may be whether the device beacon signal 108 is detectable by the WWAN receiver 718. Examples of other characteristics include a signal to noise ratio (SNR), bit error rate (BER), power level, signal propagation time, and presence of particular data. An example of technique for determining the proximity is discussed in U.S. patent application Ser. No. 11/565,266 entitled "APPARATUS, SYSTEM AND METHOD FOR MANAGING WIRELESS LOCAL AREA NETWORK SERVICE TO A MULTI-MODE PORTABLE COMMUNICATION DEVICE", filed on Nov. 30, 2006, and incorporated by reference in its entirety herein.

After receiving the search message, the wireless communication device 704 searches for an access point in accordance with the adjusted search scheme. In response to the search message, the wireless communication device 704 activates the appropriate circuitry to receive signals transmitted by the access point 702 such as a beacon pilot signal or communication pilot signals. Such circuitry is activated in response to reception of the search message. After the access point 702 is found by the wireless communication device 704, the wireless communication device 704 may engage in a handoff procedure where, after a determination that the wireless communication device 704 should be handed off to the access point, the system 700 establishes wireless service to the wireless communication device 704 from the access point 702. Hence, data and control communication is made through communication channel 720 between the wireless communication device 704 and the access point 702.

Figure 8:
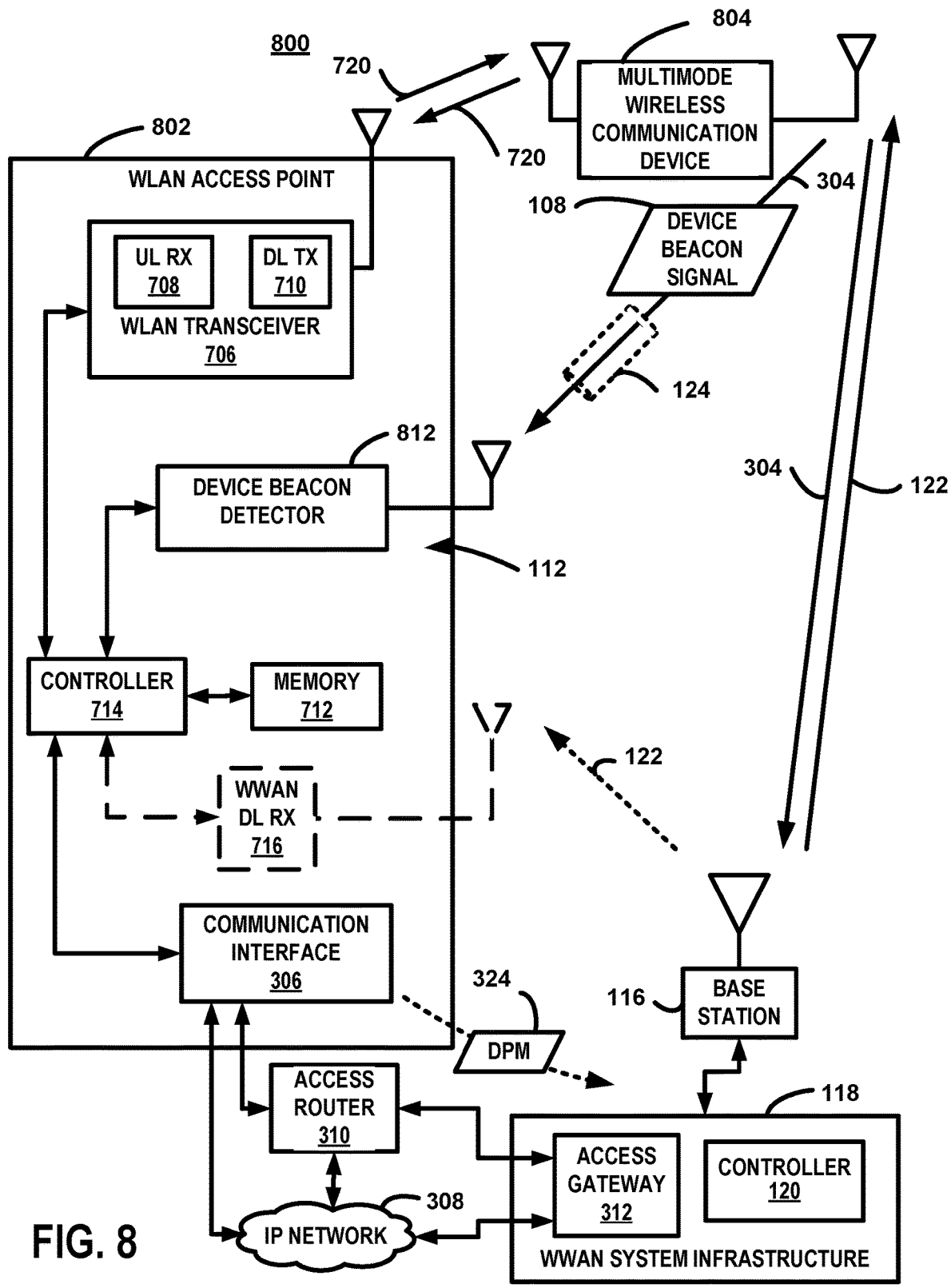
FIG. 8 is block diagram of a communication system where a device beacon signal is transmitted in a beacon channel that is not a WWAN channel.

FIG. 8 is block diagram of a communication system 800 where device beacon signal is transmitted in a beacon channel 124 that is not a WWAN channel. The access point 802 includes a device beacon detector 812 that is not a WWAN receiver. Any of numerous frequencies and channels can be used for the beacon channel where the beacon channel is based on the WWAN system timing. The beacon may be transmitted in unlicensed frequency bands in some circumstances. The beacon may be transmitted in accordance existing beacon transmissions within 802.11 (WiFi) systems. Beacon transmissions are part of power conversation used by systems such as 802.11. In some circumstances, the timing of these beacon transmissions could be a function of WWAN system timing (assuming WLAN is aware of WWAN timing as well). The system timing provides a reference for the wireless communication device 804 and the WLAN access point 802 to use in sending and receiving the device beacon signal 108. The system timing can be applied to establish a designated time for transmitting the beacon even though the actual channel is not a WWAN channel.

Operation of the WLAN access point 802 is as described above with reference to FIG. 7 except that the device beacon detector 812 does not include a WWAN receiver. Accordingly, system timing is applied to the receiver (not shown) within the device beacon detector 812 to monitor the appropriate beacon channels for device beacons. The system timing may be derived from information sent through the backhaul or may be derived by intercepting WWAN downlink signal 122. The WWAN receiver 716 is shown with dashed lines to illustrate that the receiver is optional. As discussed above with respect to FIG. 7, the WLAN access point 802 includes a memory 712 and a controller 714 which accomplish the pertinent tasks performed in the WLAN access point 702. After the access point 802 is found by the wireless communication device 804, the wireless communication device 804 may engage in a handoff procedure where, after a determination that the wireless communication device 804 should be handed off to the access point, the system 800 establishes wireless service to the wireless communication device 804 from the access point 802. Hence, data and control communication is made through communication channel 720 between the wireless communication device 804 and the access point 802.

Figure 9A:
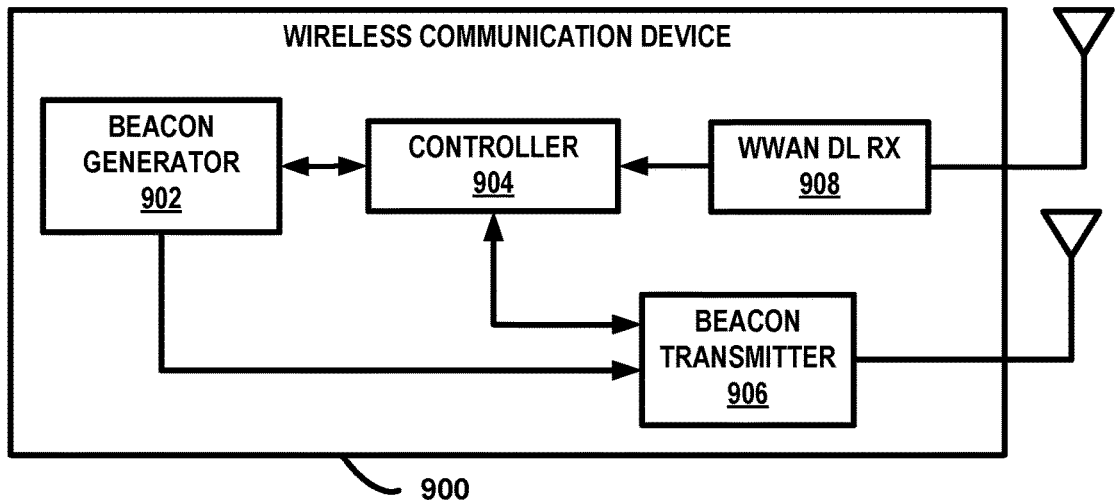
FIG. 9A is a block diagram of an example of a wireless communication device n.
Figure 9B:
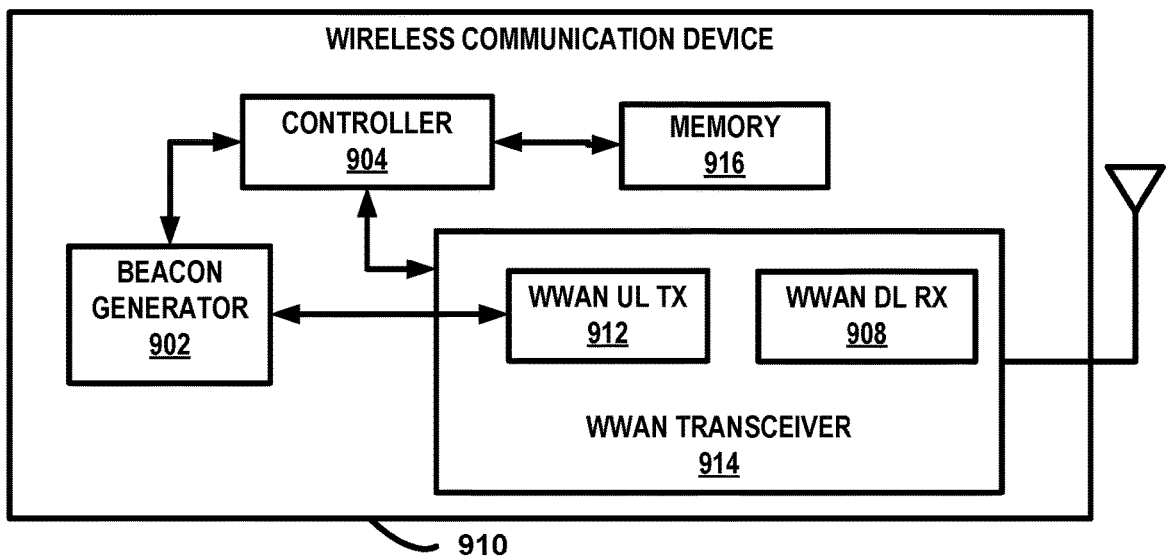
FIG. 9B is a block diagram of another example of a wireless communication device invention where the beacon transmitter includes a WWAN uplink transmitter.
Figure 9C:
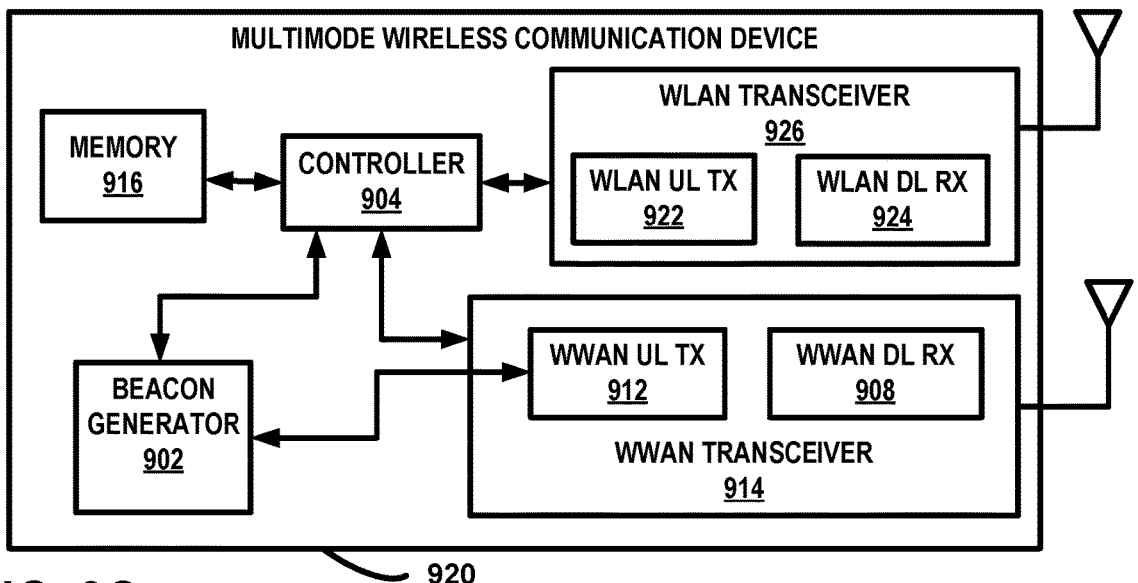
FIG. 9C is a block diagram of an example of a multimode wireless communication device where the beacon is transmitted by the WWAN uplink transmitter.
Figure 9D:
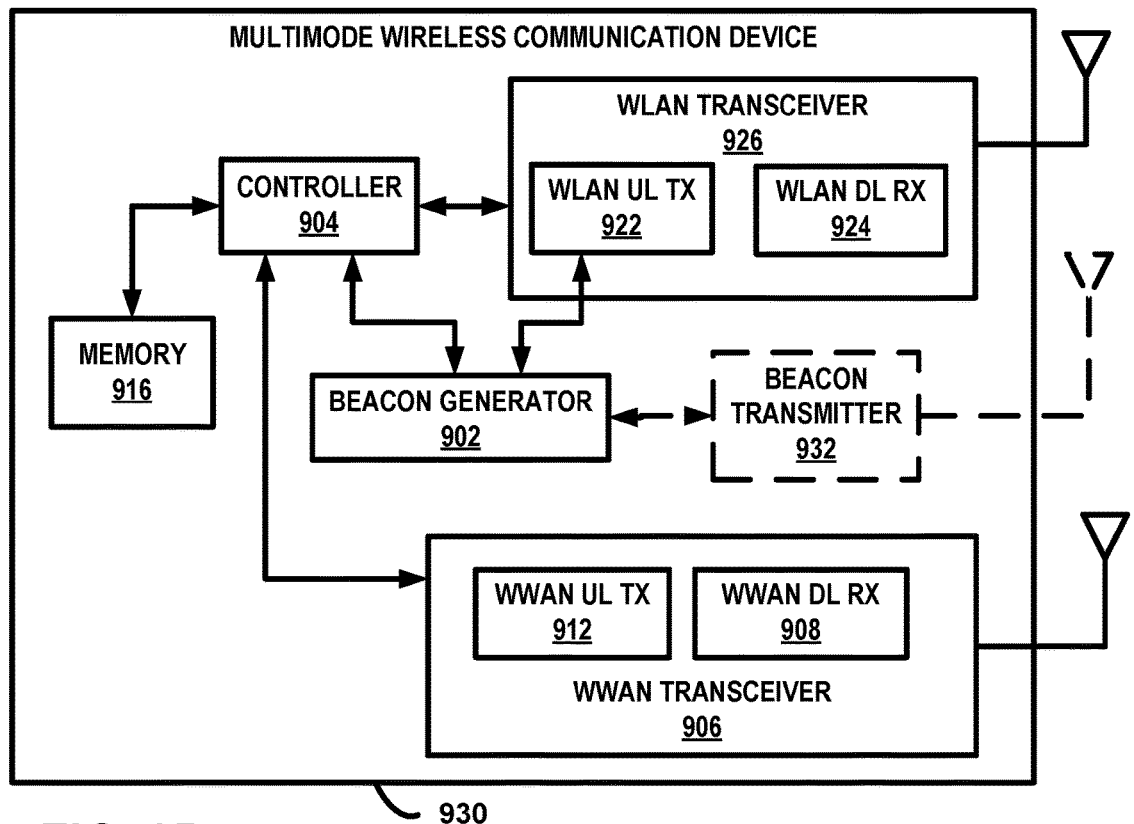
FIG. 9D is a block diagram of an example of another multimode wireless communication device where the beacon is transmitted within a beacon channel that is not a WWAN uplink channel.

FIG. 9A and FIG. 9B are block diagrams of examples of wireless communication devices 900, 910 suitable for use as a wireless communication device 106 and FIG. 9C and FIG. 9D are block diagrams of examples of multimode wireless communication devices 920, 930 suitable for use as multimode wireless communication devices 704. The functional blocks of each of the communication devices shown in FIG. 9A, FIG. 9B, FIG. 9C and FIG. 9D may be implemented using any combination of hardware, software and/or firmware. Two or more of the functional blocks may be integrated in a single device and the functions described as performed in any single device may be implemented over several devices. For example, at least portions of the functions of the beacon generator 902 may be implemented by the controller 904 in some circumstances.

The wireless communication device 900 includes at least a beacon generator 902, a controller 904, a beacon transmitter 906, and a WWAN downlink receiver 908. As discussed below the beacon transmitter 906 may include a WWAN transmitter or may include another type of transmitter depending on the channel used for beacon transmission. The WWAN downlink receiver 908 receives WWAN downlink signal that include WWAN system timing information. The controller derives the system timing information from the signals and the beacon generator applies the WWAN system timing to generate a device beacon. The device beacon is transmitted by the beacon transmitter 906.

FIG. 9B is a block diagram of a wireless communication device 910 where the beacon transmitter includes a WWAN uplink transmitter 912. For the example of FIG. 9B, a WWAN transceiver 914 provides an interface to the WWAN. The WWAN transceiver 914 includes the WWAN uplink transmitter 912 and the WWAN downlink receiver 908. The transceiver 914 transmits and receives WWAN signals to facilitate wireless communication with the WWAN. The beacon generator 902 applies the system timing derived from received WWAN signals to generate a device beacon signal that is transmitted within a WWAN uplink channel that is used as the beacon channel. For the examples of FIG. 9B, FIG. 9C and FIG. 9D, the wireless communication device also includes a memory 916. In some cases, the memory is part of the controller. In addition to storing other information and code, the memory stores code, that when run on the controller, manages the functions described herein.

FIG. 9C is a block diagram of multimode wireless communication device 920 where the beacon is transmitted by the WWAN uplink transmitter. In addition to the functional blocks described above, the multimode wireless communication also includes a WLAN transceiver 926 for communicating with a WLAN. The WLAN transceiver includes a WLAN UL transmitter 922 for transmitting WLAN signals and a WLAN downlink receiver 924 for receiving WLAN signals. The multimode wireless communication device, therefore, may access both the WWAN and the WLAN for communication services. The WWAN signals may be received in any state and provide the WWAN system timing that is applied to generate and transmit the device beacon signal in a WWAN uplink channel designated for device beacons.

FIG. 9D is a block diagram of multimode wireless communication device 930 where the beacon is transmitted within a beacon channel that is not a WWAN uplink channel. The WWAN signal timing derived from the received WWAN signals is applied to generate the device beacon. The device beacon is transmitted through a beacon channel by a beacon transmitter that may include the WLAN uplink transmitter in some circumstances. In some circumstances, the beacon may be transmitted through separate beacon transmitter through a beacon channel that is not a WWAN or WLAN channel. Such beacon channel may be a Bluetooth channel, for example. In order to illustrate that a separate beacon transmitter is not required when the beacon is transmitted through the WLAN transmitter, the beacon transmitter is shown with dashed lines.

Figure 10:
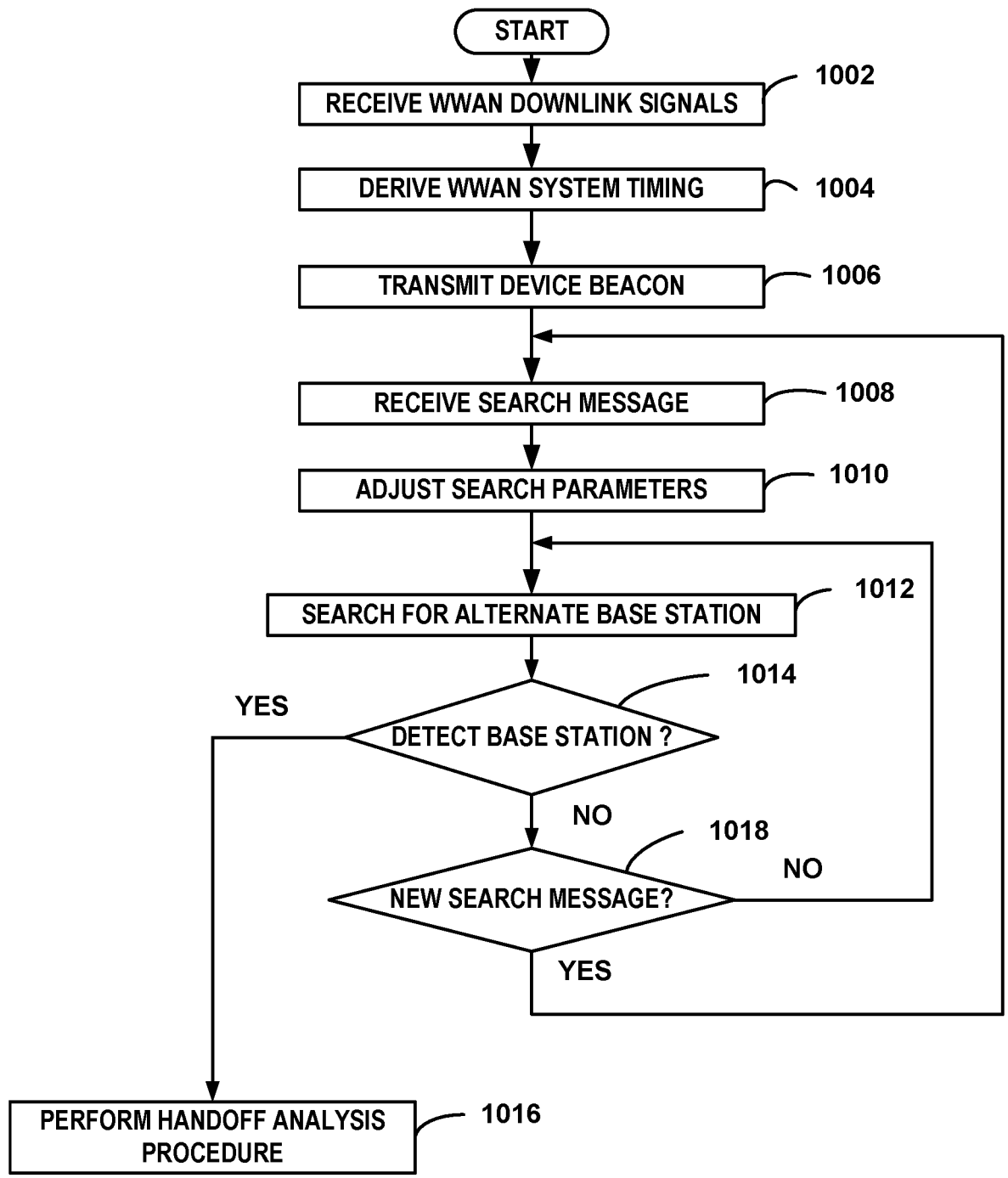
FIG. 10 is a flow chart of method performed at the wireless communication device where the transceiver node is a base station.

FIG. 10 is a flow chart of method performed at the wireless communication device where the transceiver node 104 is a base station 302. The method is performed, at least partially, by executing code on the controller 904 in the wireless communication device 106.

At step 1002, WWAN downlink signals are received from a WWAN base station 116. The signals are any signals that provide WWAN system timing information and may be received during any of several states of the wireless communication device 106 including idle (non-traffic) and active (traffic) states. As discussed above, examples of WWAN signals including system timing information include downlink control signals.

At step 1004, the system timing is derived from the WWAN signals. Typically, the receiver first synchronizes to the time slot boundaries. After achieving synchronization, the receiver detects and decodes information using knowledge about the frame-structure of WWAN downlink signals.

At step 1006, the device beacon signal is transmitted. The device beacon signal is generated and transmitted in accordance with the system timing. The beacon generator applies the system timing and any required scaling to generate a sequence that is mapped to a subcarrier channel of the WWAN uplink frequency-time space.

At step, 1008, the search message 126 is received. In accordance with known techniques, the wireless communication device periodically monitors the downlink paging channels to receive control messaging from the system infrastructure 118 during traffic and non-traffic states. The search message 126 is received and deciphered to extract the information related changes to the search parameters.

At step 1010, the changes included in the search message are applied to the search scheme of the wireless communication.

At step 1012, the newly applied search parameters are applied in searching for an alternate base station. The wireless communication device 106 tunes the WWAN downlink receiver in accordance to the searching scheme to search for a pilot signal transmitted from the detecting base station 114 (such as a femtocell base station 302). In some circumstances, the wireless communication device 106 may search for beacons or other signals transmitted from the femtocell base station 302.

At step 1014, it is determined whether the base station 302 has been detected. If a signal from the base station 302 is detected, the method continues at step 1016, where a handoff procedure is performed. The procedure may include an analysis to determine whether a handoff should be performed. A handoff is initiated in accordance with known techniques. Otherwise, the method continues at step 1018.

At step 1018, it is determined whether a new search message is being transmitted. If so, the method returns to step 1008 to receive the new search message. Otherwise, the method returns to step 1012 to continue searching for the femtocell base station.

Figure 11:
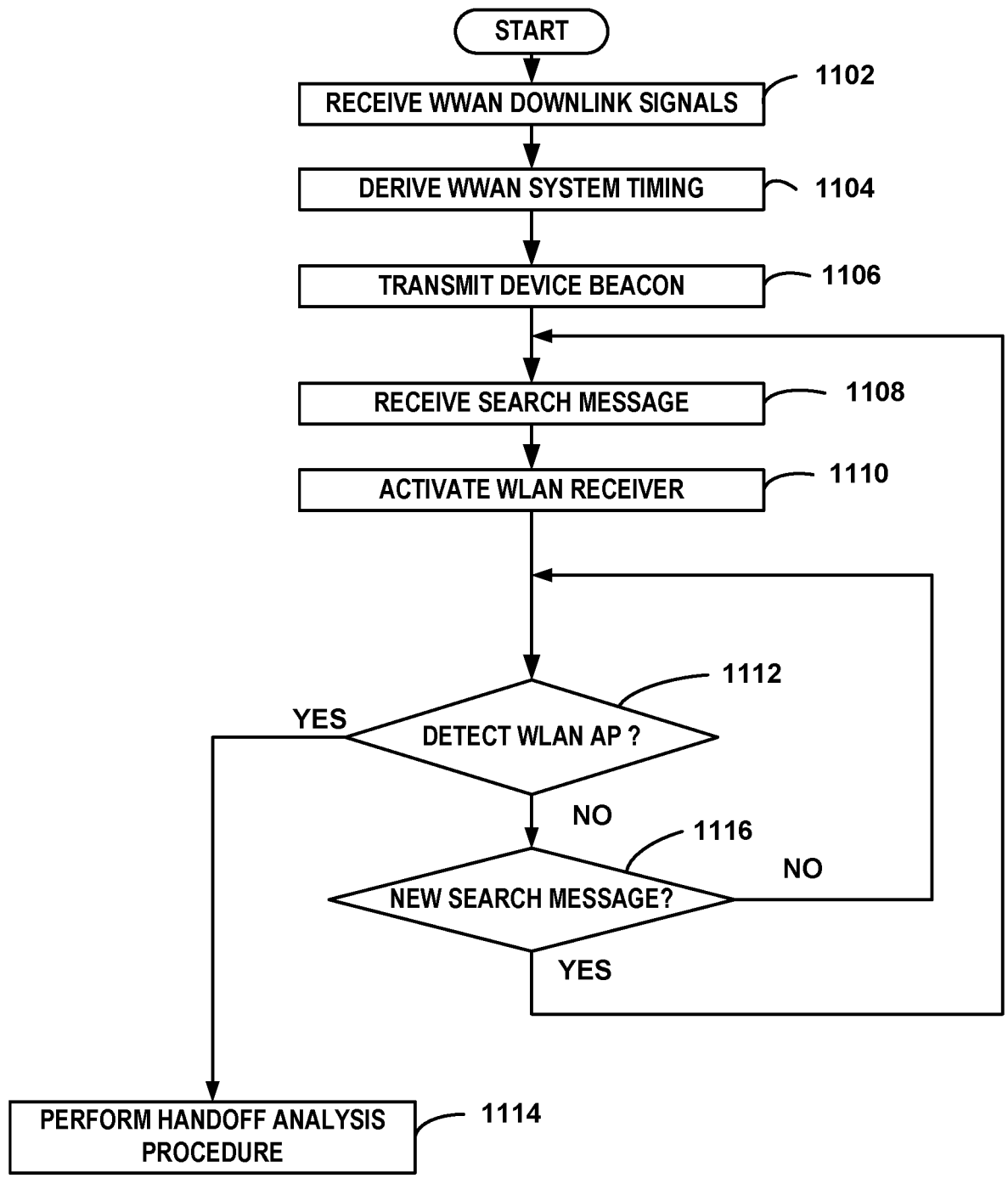
FIG. 11 is a flow chart of method performed at the wireless communication device where the transceiver node is a WLAN access point.

FIG. 11 is a flow chart of method performed at the wireless communication device where the transceiver node 104 is a WLAN access point 702, 802. The method is performed, at least partially, by executing code on the controller 904 in the wireless communication device 106 (920, 930).

At step 1102, WWAN downlink signals are received from a WWAN base station 116. The signals are any signals that provide WWAN system timing information and may be received during any of several states of the wireless communication device 106 including idle (non-traffic) and active (traffic) states. Examples of WWAN signals including system timing information include downlink control signals At step 1104, the system timing is derived from the WWAN signals. Typically, the receiver first synchronizes to the time slot boundaries. After achieving synchronization, the receiver detects and decodes information using knowledge about the frame-structure of WWAN downlink signals.

At step 1106, the device beacon signal is transmitted. The device beacon signal is generated and transmitted in accordance with the system timing. The beacon generator applies the system timing and any required scaling to generate a sequence that is mapped to a subcarrier channel of the WWAN uplink frequency-time space. In some circumstances, the beacon signal may be transmitted within a beacon channel that is not a WWAN uplink channel.

At step, 1108, the search message 126 is received. In accordance with known techniques, the wireless communication device periodically monitors the downlink paging channels to receive control messaging from the system infrastructure 118 during traffic and non-traffic states. For this example, the search message indicates that the WLAN receiver should be activated to search for signals transmitted by the WLAN access point.

At step 1110, the WLAN receiver is activated in response to receiving the search message. Accordingly, the wireless communication device 106 searches for the WLAN access point. In some circumstances, the wireless communication device 106 may search for beacons or other signals transmitted from the WLAN access point 702, 802.

At step 1112, it is determined whether WLAN access point 702, 802 has been detected. If a signal from the WLAN access point 702, 802 is detected, the method continues at step 1114, where a handoff procedure is performed and a handoff is initiated in accordance with known techniques. Otherwise, the method continues at step 1116.

At step 1116, it is determined whether a new search message is being transmitted. If so, the method returns to step 1108 to receive the new search message. Otherwise, the method returns to step 1110 to continue searching for the femtocell base station.

Figure 12A:
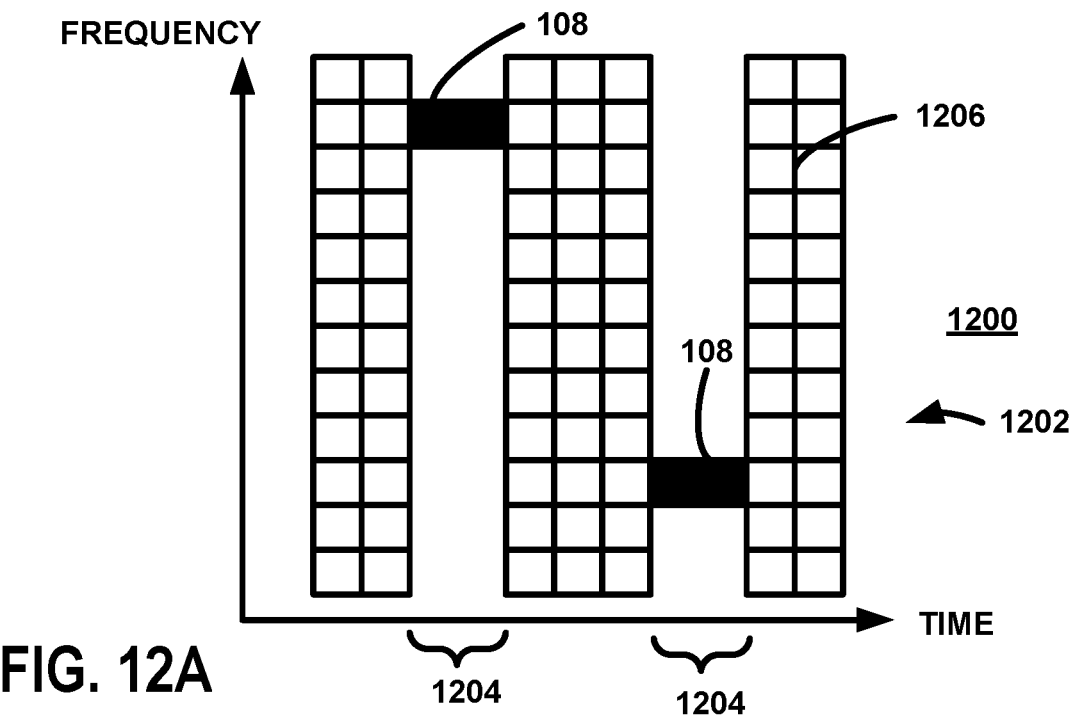
FIG. 12A, FIG. 12B and FIG. 12C are graphical illustrations of exemplary relationships between the device beacon and the frequency-time space of the uplink WWAN channel when the WWAN system utilizes OFDM techniques.
Figure 12B:
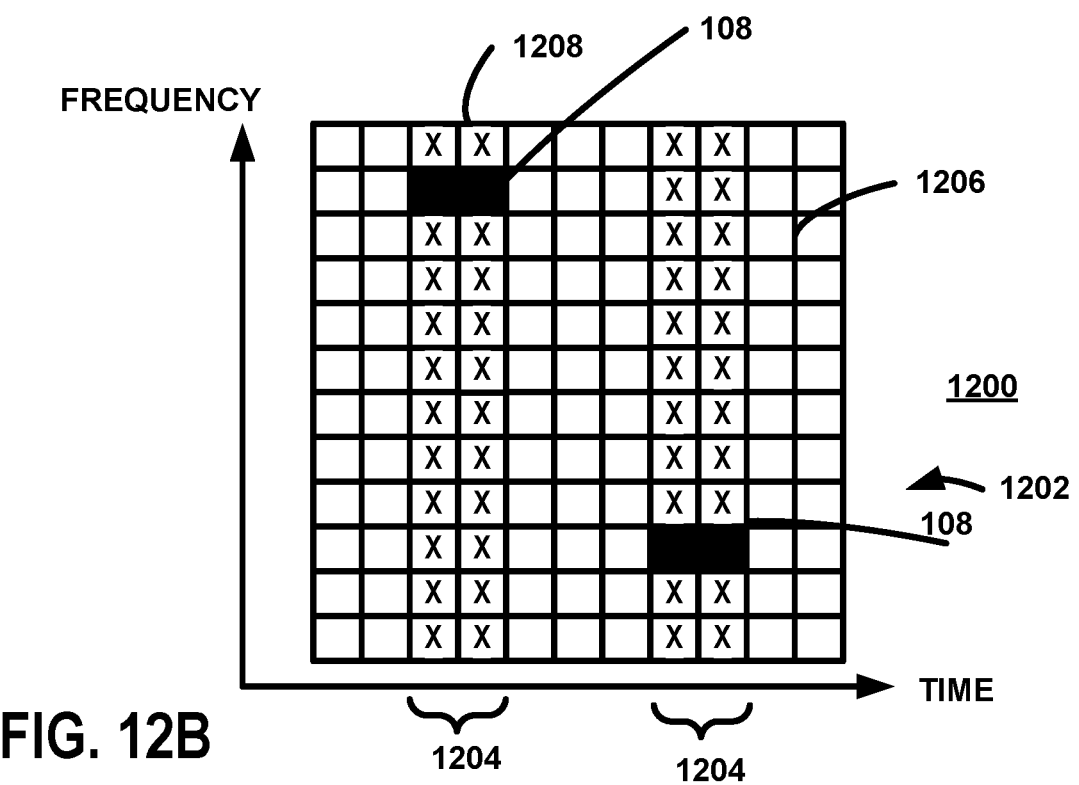
Figure 12C:
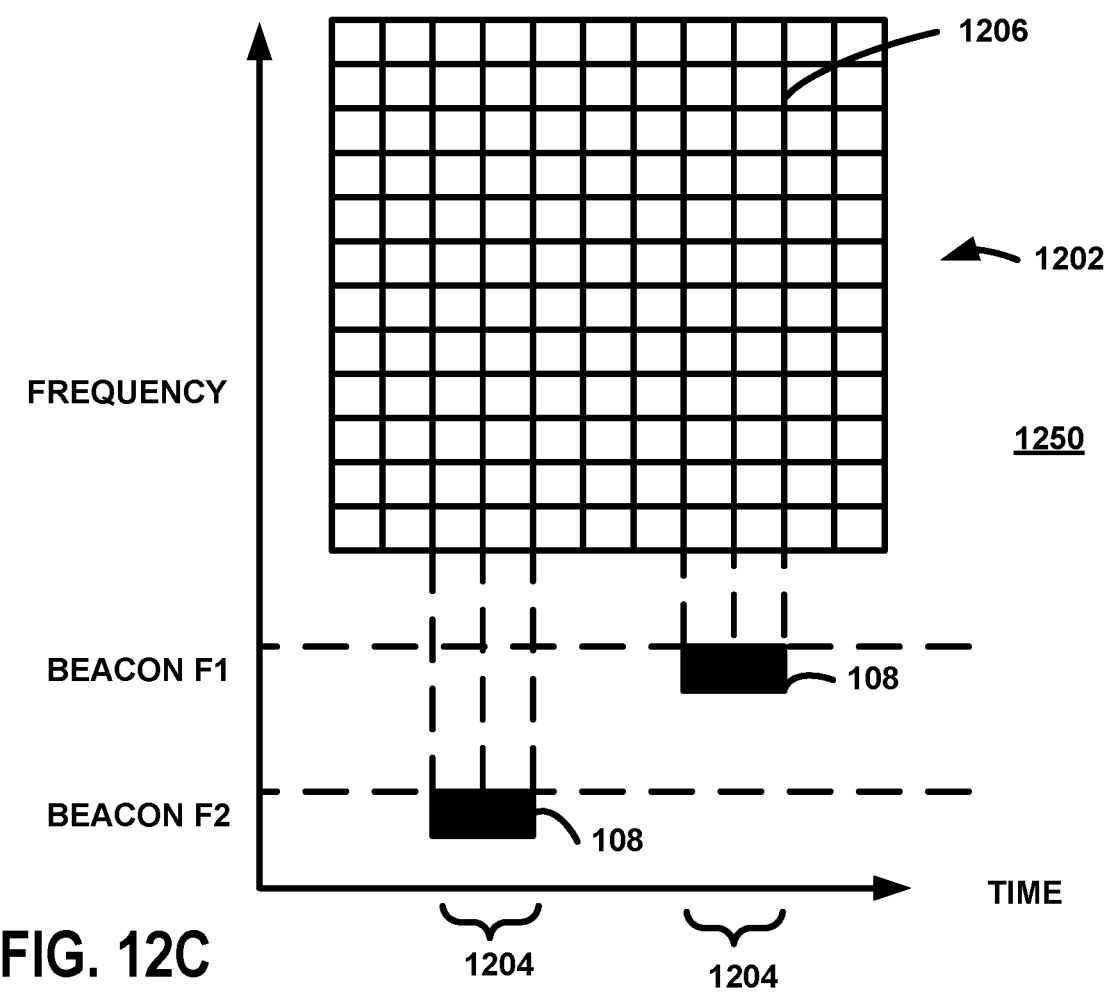

FIG. 12A, FIG. 12B and FIG. 12C are graphical illustrations of exemplary relationships 1200, 1250 between the device beacon 108 and the frequency-time space 1202 of the uplink WWAN channel when the WWAN system utilizes OFDM techniques. The uplink WWAN channels are divided in time and frequency to allocate channels for wireless communication device uplink transmissions. The carriers are divided in time to provide subcarriers 1206 that are assigned to the different wireless communication devices. FIG. 12A, FIG. 12B and FIG. 12C are provided for general illustrative purposes and implementations may use different numbers of channels and subcarriers. For the example of FIG. 12A, the device beacon is transmitted within the WWAN uplink channel where the beacon signal is at an assigned subcarrier and no other subcarriers are assigned during the beacon transmission time period 1204. In FIG. 12B, some or all of the subcarriers within the beacon transmission time period 1204 may include data or control information. In other arrangements, some or all of the subcarriers 1208 within the device beacon transmission period 1204 may be assigned for data or control signaling. The subcarriers that may include data within the beacon transmission period 1204 are illustrated with boxes containing "x"s in FIG. 12B.

FIG. 12C is a graphical illustration of an example where the device beacon is transmitted outside to the WWAN uplink channel. The device beacon is transmitted at a first frequency during a beacon time period and at a second frequency during a second beacon transmission time period. The first beacon frequency and the second beacon frequency are not within the WWAN uplink channel. The device beacon, however, is transmitted in accordance with the WWAN system timing. Accordingly, the device beacon transmission period 1204 coincides with subcarrier timing of the WWAN uplink channel.

Figure 13A:
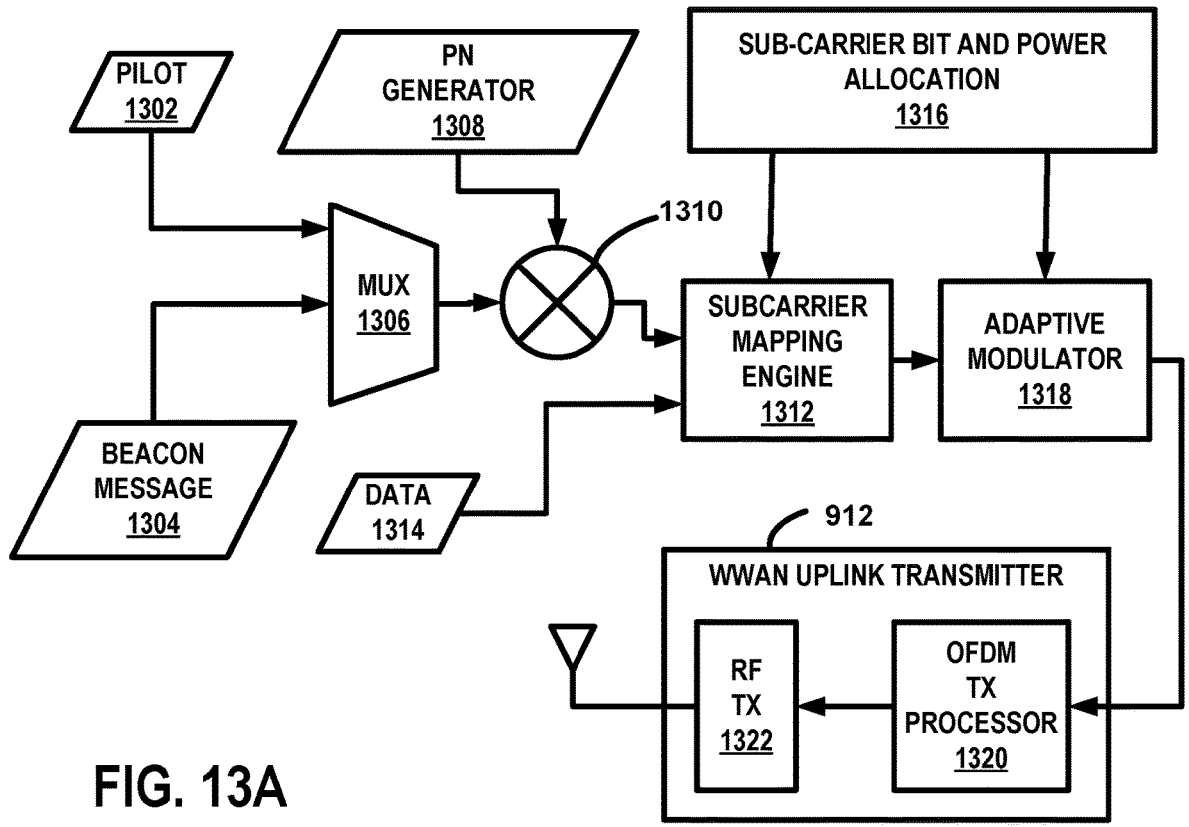
FIG. 13A is a block diagram of a beacon generator connected to a beacon transmitter wherein the device beacon is transmitted within the WWAN uplink channel.

FIG. 13A is a block diagram of a beacon generator 902 connected to a beacon transmitter wherein the device beacon is transmitted within the WWAN uplink channel. The beacon generator 902 may be implemented with any combination of hardware, software, and/or firmware. The blocks shown in FIG. 13A represent functions and may not be performed by distinct hardware blocks. Accordingly, two or more of the functional blocks may be integrated in a single device and the functions described as performed in any single device may be implemented over several devices or processes. For the example of FIG. 13A, the device beacon is transmitted within the WWAN uplink channel and the beacon transmitter is the WWAN uplink transmitter 912. The description of FIG. 13A may be applied to different types of OFDM systems by modifying the transmitter chain in accordance with known techniques. For example, the beacon generator maybe used in a Single-Carrier FDMA (SC-FDMA) system by appropriately processing the signals using Discrete Fourier Transform (DFT) and Inverse Discrete Fourier Transform (IDFT) stages at the transmitter and receiver, respectively.

A pilot signal 1302, such as baseband bit string, is multiplexed with a beacon message 1304 in a multiplexer 306. The beacon message consists of pre-determined data with a preamble (for acquisition) and/or a repeatable sequence. The beacon message may also include information such at the location of the device 106 or a transmission power level as well as other information related to the communication device 106. The resulting multiplexed signal is scrambled with a pseudorandom sequence 1308 in a mixer 1310. Typically, a scrambling sequence is unique to a specific wireless communication device but other types of sequences (pseudo-unique) are also possible. The mixer 1308 is an exclusive OR (XOR) circuit in this example. A subcarrier mapping engine 1312 maps the scrambled beacon and other data 1314 into the WWAN uplink channel using the WWAN system timing 110. In accordance with known techniques, a subcarrier bit and power allocator 1316 generates the OFDM signal my managing the subcarrier mapping engine 1312 and adaptive modulator 1318 which applies BPSK, QPSK, M-QAM or other suitable symbols. Channel condition feedback provided by a receiver is typically applied by the subcarrier bit and power allocator 1316 to select a different modulation order and power level per subcarrier. In some circumstances, however, the beacon can be transmitted with a pre-determined (fixed) modulation order and power level.

The mapped and processed subcarriers are transmitted by the beacon transmitter which, in this case, is the WWAN uplink transmitter 912. The WWAN uplink transmitter 912 includes an OFDM transmission processor 1320 and a radio frequency transmitter 1322. Accordingly, the WWAN uplink signal including the data and device beacon is transmitted in accordance with OFDM techniques in this example.

Figure 13B:
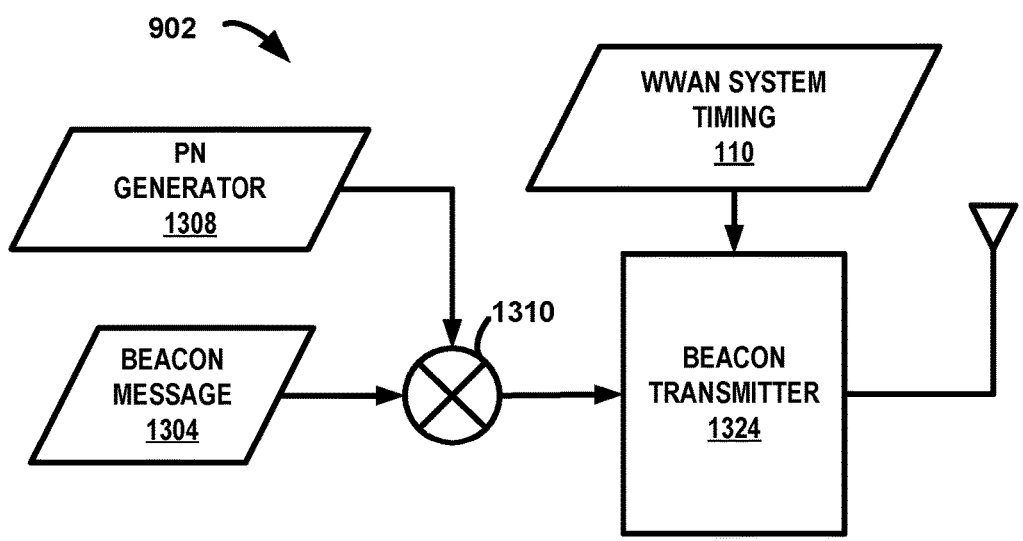
FIG. 13B is a block diagram of a beacon generator connected to a beacon transmitter wherein the device beacon is transmitted outside of the WWAN uplink channel.

FIG. 13B is a block diagram of a beacon generator 902 where the device beacon is transmitted outside of the WWAN uplink channel. The beacon message 1304 is scrambled with the PN generator sequence 1308 in the mixer 1308. The WWAN system timing 110 is applied to the beacon transmitter 932 to generate and transmit the beacon in accordance with the WWAN system timing. The beacon transmitter 932, includes appropriate modulation and amplification circuitry as well as timing circuitry to control transmission timing. For example, a switching function can be applied to the scrambled sequence to align the device beacon transmission period with one or more WWAN uplink subcarriers. The beacon is transmitted by aligning the uplink frame transmitted to the WWAN base station. A simple switch can be turned on at the same time or at an early/late time-offset relative to the beginning of the uplink frame. Perfect synchronization is not required to receive the beacon. The reference timing increases the successful detection of that beacon detector. In some circumstances the beacon can be time-aligned using a local clock where the local clock is synchronized with the WWAN system timing. The clock is used for triggering transmissions and an early or late offset may be applied as needed. Therefore, even though the device beacon signal is transmitted at a frequency other than an uplink WWAN frequency, the beacon signal has a position in time that is based on the WWAN system timing.

Figure 14:
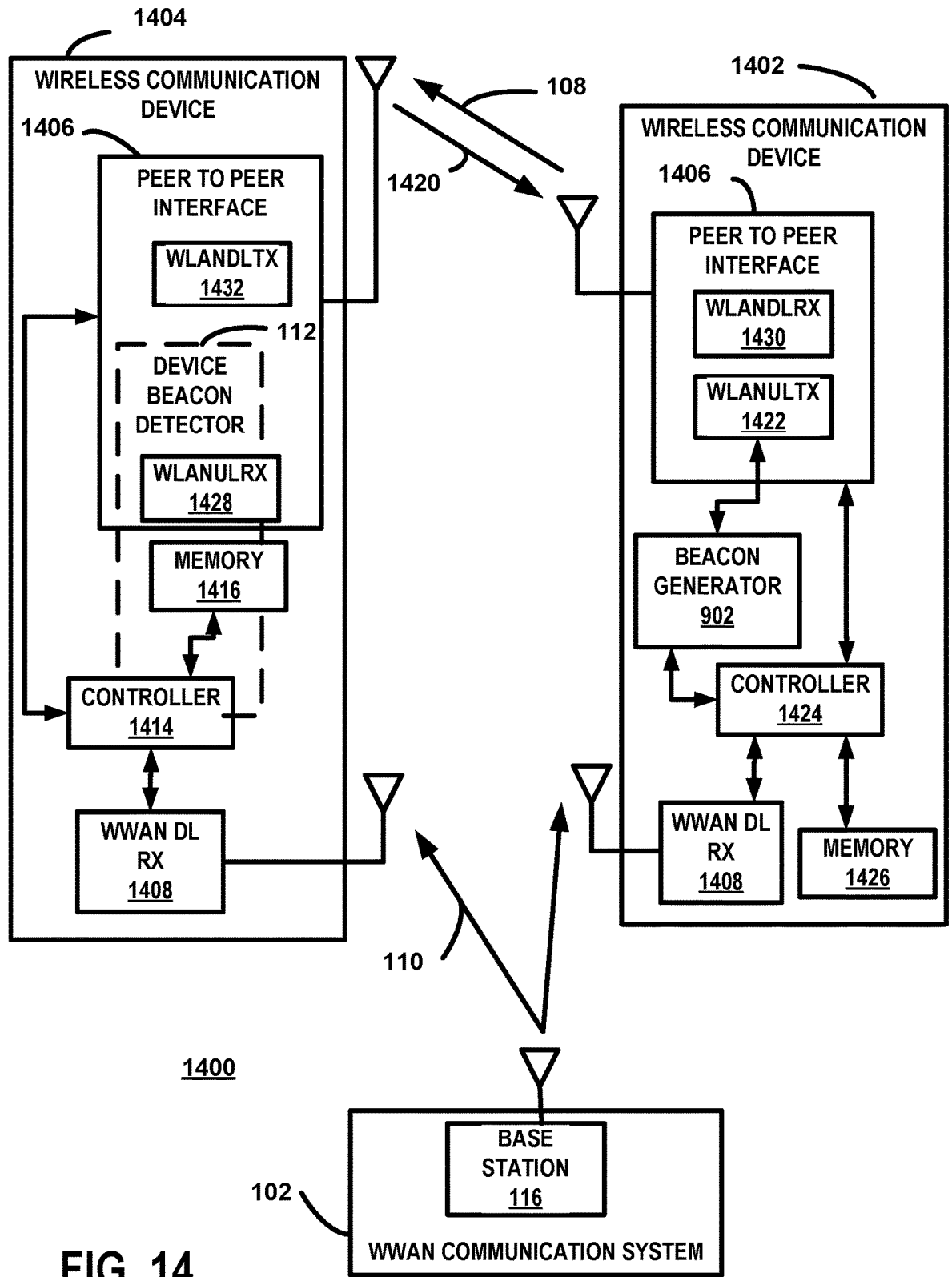
FIG. 14 is a block diagram of a communication system in accordance with another exemplary embodiment of the invention where at least two wireless communication devices are able to communicate through a peer to peer link.

FIG. 14 is block diagram of a communication system 1400 where at least two wireless communication devices are able to communicate through a peer to peer link. The wireless communication devices 1402, 1404 each include at least a peer to peer interface 1406 and a WWAN downlink receiver 1408. In some circumstances, one or more of the devices 1402, 1404 may be a multimode wireless communication device and the WWAN downlink receiver 1408 may be part of a WWAN transceiver that also includes a WWAN uplink transmitter (not shown). The peer to peer interface is a WLAN transceiver in this example. The peer to peer link, however, may utilize other communication technologies, frequencies, and protocols in some circumstances and the peer to peer interfaces may be something other than WLAN transceivers. At least one of the devices 1402 includes a beacon generator 902 and at least one includes beacon detector 112. Accordingly, FIG. 14 illustrates an example where the transceiver node 104 is the wireless communication device 1404 and the other wireless communication device 1402 is the wireless communication device 106 of FIG. 1A. The wireless communication device 1404 is, therefore, also an example of the wireless communication device 128 of FIG. 10.

Each wireless communication device 1402, 1404 includes a controller 1414, 1424, a WWAN receiver 1408 and memory 1416, 1426. The controller 1414 (1424) is any electronics, processor, microprocessor or processor arrangement that manages the functions described herein as well as facilitating the overall functionality of the wireless communication device 1402 (1404). The memory 1416, 1426 is any combination of RAM and/or ROM devices that can store code, ID values and other parameters, values, and data for facilitating the described tasks.

For the example of FIG. 14, the device beacon signal 108 is transmitted within the WLAN channel. The beacon generator 902 generates the beacon signal that is transmitted by the WLAN uplink transmitter 1422 in the peer to peer interface. The device beacon detector 112 in the wireless communication device 1404 is formed by the controller 1414, memory 1416 and WLAN uplink receiver 1428. Each wireless communication device 1402, 1404 includes a WWAN downlink receiver 1408 configured to at least receive WWAN downlink signals that provide WWAN system timing information 110. Where the device beacon 108 is transmitted using a channel other than a WLAN channel, the beacon generator and beacon detector are implemented in accordance with the required frequency, channel and protocols of the beacon channel.

After detecting the device beacon signal 108, the wireless communication device 1404 invokes a communication to the wireless communication device 1402. For this example, the wireless communication device 1404 generates and transmits an acknowledgement message 1420 to the wireless communication device 1402. The acknowledgement message 1420 is transmitted using a WLAN channel. In some circumstances, an acknowledgement message may be sent through the WWAN system. Further, a device proximity message may be sent to the WWAN communication system and the WWAN communication system may notify the wireless communication device 1402 that the beacon was detected by sending, for example, a search message. The devices 1402, 1404 establish a peer to peer communication link after communications are exchanged in response to the detection of the device beacon signal. Accordingly, the detection of the device beacon signal initiates a peer to peer link establishment procedure. After the peer to peer link is established, the system 1400 establishes wireless service between the wireless communication devices 1402 and 1404. Hence, data and control communication is made utilizing WLAN downlink receiver 1430 and uplink transmitter 1422 of the wireless device 1402 in communicating with the WLAN downlink transmitter 1432 and uplink receiver 1428 of the wireless device 1404.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A first wireless communication device comprising:
   a transceiver configured to:
      receive wireless wide area network (WWAN) signals within downlink channels of the WWAN via a first frequency band, transmitted from a base station of the WWAN, the WWAN signals comprising a synchronization signal for acquiring system timing of the WWAN and first information, the first information being broadcasted from the base station and identifying at least one frequency and one time within a frequency-time space including a plurality of frequencies and a plurality of times in a second frequency band, the at least one frequency and one time allocated for transmission of direct signals transmitted directly to a second wireless communication device via the second frequency band different from and outside of the first frequency band; and
   a generator configured to generate the direct signals by mapping sequences into frequency-time space of the second frequency band based on the system timing of the WWAN and the first information, the direct signals including second information indicating the first wireless communication device derives its timing from the system timing from the base station of the WWAN,
   wherein, the transceiver is further configured to:
      periodically transmit the direct signals, in the frequency-time space of the second frequency band based on the at least one frequency and based on the time, directly to the second wireless communication device at timing based on the system timing; and
      perform direct communication with the second wireless communication device.

2. The first wireless communication device of claim 1, wherein the direct signals include third information indicating location of the first wireless communication device.

3. The first wireless communication device of claim 1, wherein the direct signals are transmitted within a WWAN Orthogonal Frequency-Division Multiplexing (OFDM) subcarrier time slot.

4. The first wireless communication device of claim 1, wherein the direct signals are transmitted within a WWAN Single-Carrier Frequency Division Multiple Access (SC-FDMA) subcarrier time slot.

5. A method comprising:
   receiving, at a first wireless communication device, wireless wide area network (WWAN) signals within downlink channels of the WWAN via a first frequency band, transmitted from a base station of the WWAN, the WWAN signals comprising a synchronization signal for acquiring system timing of the WWAN and first information, the first information being broadcasted from the base station and identifying at least one frequency and one time within a frequency-time space including a plurality of frequencies and a plurality of times in a second frequency band, the at least one frequency and one time allocated for transmission of direct signals transmitted directly to a second wireless communication device via the second frequency band different from and outside of the first frequency band;

generating, at the first wireless communication device, the direct signals by mapping sequences into a frequency-time space of the second frequency band based on the system timing of the WWAN and the first information, the direct signals including second information indicating the first wireless communication device derives its timing from the system timing from the base station of the WWAN;

periodically transmitting the direct signals, in the frequency-time space of the second frequency band based on the at least one frequency and based on the time, directly to the second wireless communication device at timing based on the system timing; and performing direct communication with the second wireless communication device.

6. The method of claim 5, wherein the direct signals include third information indicating location of the first wireless communication device.

7. The method of claim 5, wherein the direct signals are transmitted within a WWAN Orthogonal Frequency-Division Multiplexing (OFDM) subcarrier time slot.

8. The method of claim 5, wherein the direct signals are transmitted within a WWAN Single-Carrier Frequency Division Multiple Access (SC-FDMA) subcarrier time slot.

9. The first wireless communication device of claim 1, wherein the second frequency band is an unlicensed band.

10. The method of claim 5, wherein the second frequency band is an unlicensed band.

11. The first wireless communication device of claim 1, wherein the transceiver is configured to determine when to transmit the direct signals based on the one time.

12. The method of claim 5, further comprising determining when to transmit the direct signals based on the one time.

* * * * *